(12) United States Patent
Sakata et al.

(10) Patent No.: US 6,631,073 B1
(45) Date of Patent: Oct. 7, 2003

(54) ELECTRODE MATERIAL AND METHOD FOR PRODUCING THE SAME

(75) Inventors: Yusaku Sakata, Okayama (JP); Akinori Muto, Okayama (JP); Satoshi Ibaraki, Osaka (JP); Kenji Kojima, Yamaguchi (JP); Chisato Marumo, Osaka (JP); Niro Shiomi, Nara (JP)

(73) Assignee: Kanebo, Limited, Tokyo (JP)

( * ) Notice: Subject to any disclaimer, the term of this patent is extended or adjusted under 35 U.S.C. 154(b) by 0 days.

(21) Appl. No.: 09/763,491
(22) PCT Filed: Aug. 23, 1999
(86) PCT No.: PCT/JP99/04541
§ 371 (c)(1),
(2), (4) Date: Apr. 23, 2001
(87) PCT Pub. No.: WO00/11688
PCT Pub. Date: Mar. 2, 2000

(30) Foreign Application Priority Data

Aug. 25, 1998 (JP) ............................................. 10-238420

(51) Int. Cl.$^7$ ............................ H01G 9/00; H01G 9/042
(52) U.S. Cl. ....................................... 361/502; 361/303
(58) Field of Search ................................ 361/502, 508, 361/516, 303; 502/416, 418, 429, 170, 151, 158, 159, 260; 429/231.8, 231.4

(56) References Cited

U.S. PATENT DOCUMENTS

| | | | | |
|---|---|---|---|---|
| 5,916,837 A | * | 6/1999 | Harmer et al. ............... | 502/170 |
| 5,956,225 A | * | 9/1999 | Okuyama et al. ........... | 361/502 |
| 6,118,650 A | * | 9/2000 | Maeda et al. ................ | 361/508 |
| 6,515,845 B1 | * | 2/2003 | Oh et al. ..................... | 361/502 |

\* cited by examiner

Primary Examiner—Anthony Dinkins
(74) Attorney, Agent, or Firm—Flynn, Thiel, Boutell & Tanis, P.C.

(57) ABSTRACT

Disclosed are electrode materials that exhibit very sharp pore size distribution within the range of mesopores and include pores having a pore diameter within a range of $X \pm \alpha$ nm ($3.0 \leq X < 10$, $\alpha = 1.0$; range of pore size distribution) of which volume accounts for 15% or more of the total volume of mesopores having a pore diameter within a range from 2.0 to 50 nm, and are suited for use in electric double layer capacitor, battery or the like of large capacitance and discharge of large current. These electrode materials are obtained by adding at least one transition metal or at least one transition metal compound to a carbon material or a carbon material precursor, and subjecting to a heat treatment at a temperature of 600° C. or higher.

14 Claims, 9 Drawing Sheets

[Fig. 1]
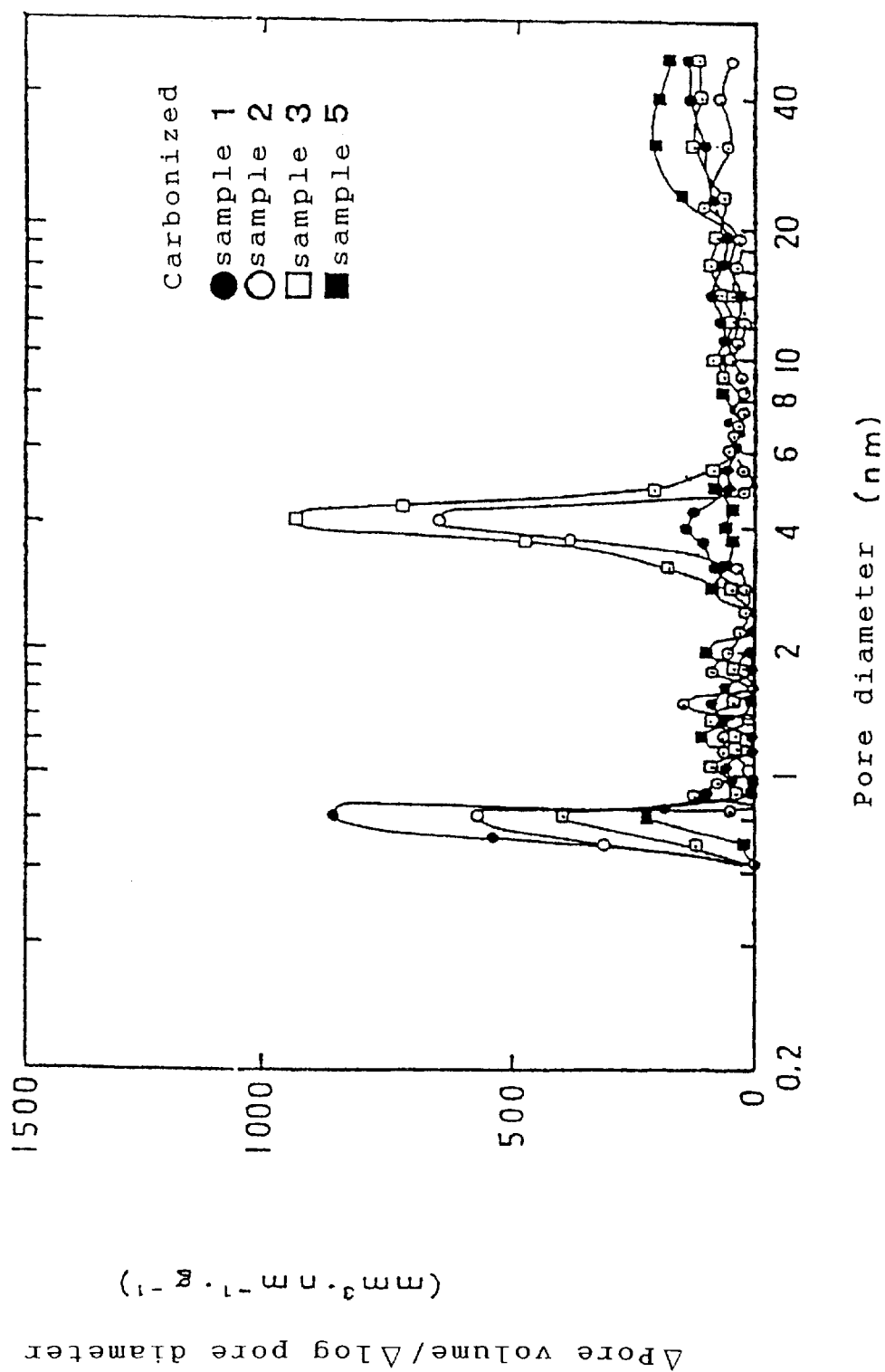

[Fig. 2]
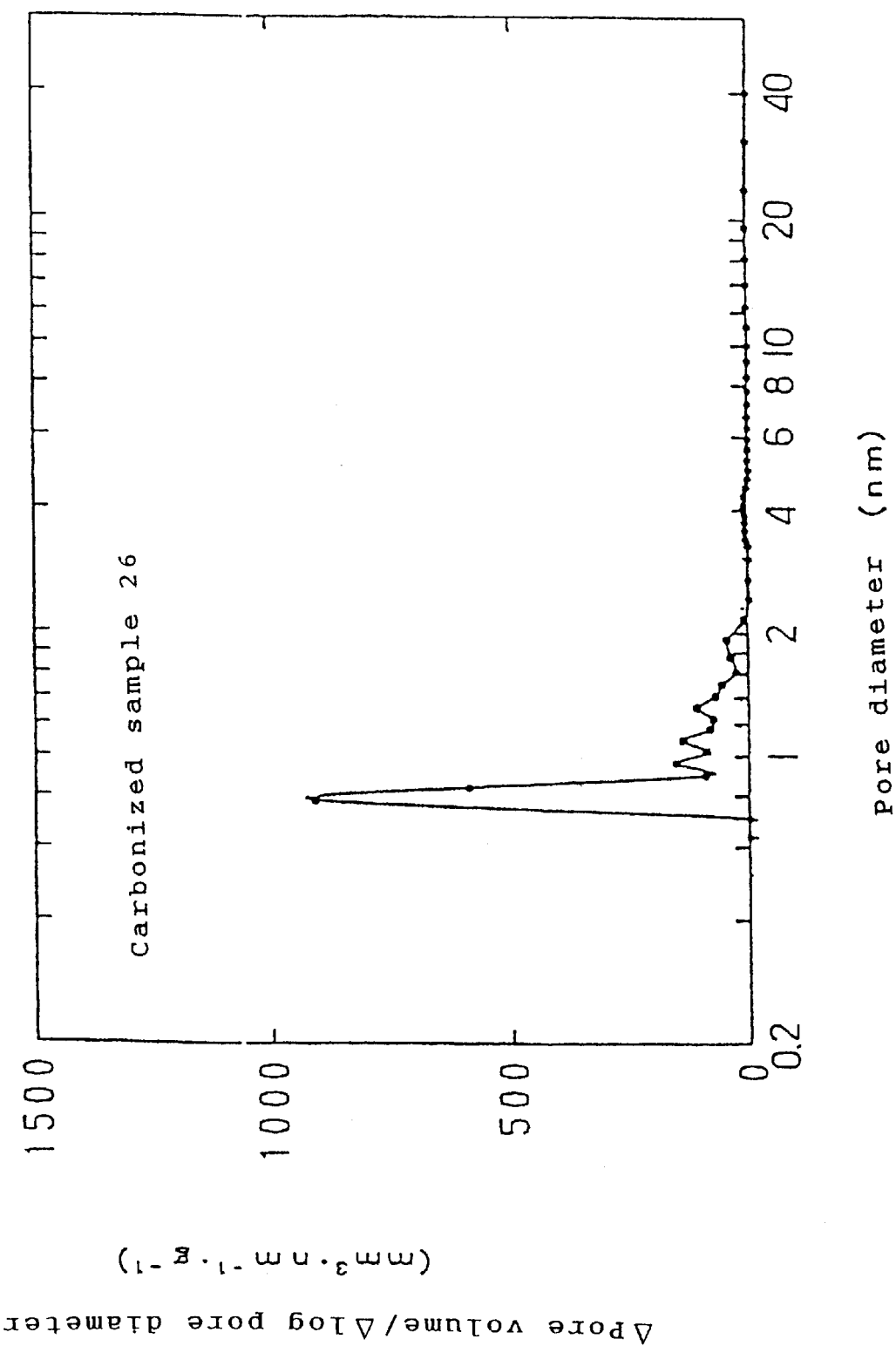

[Fig. 3]
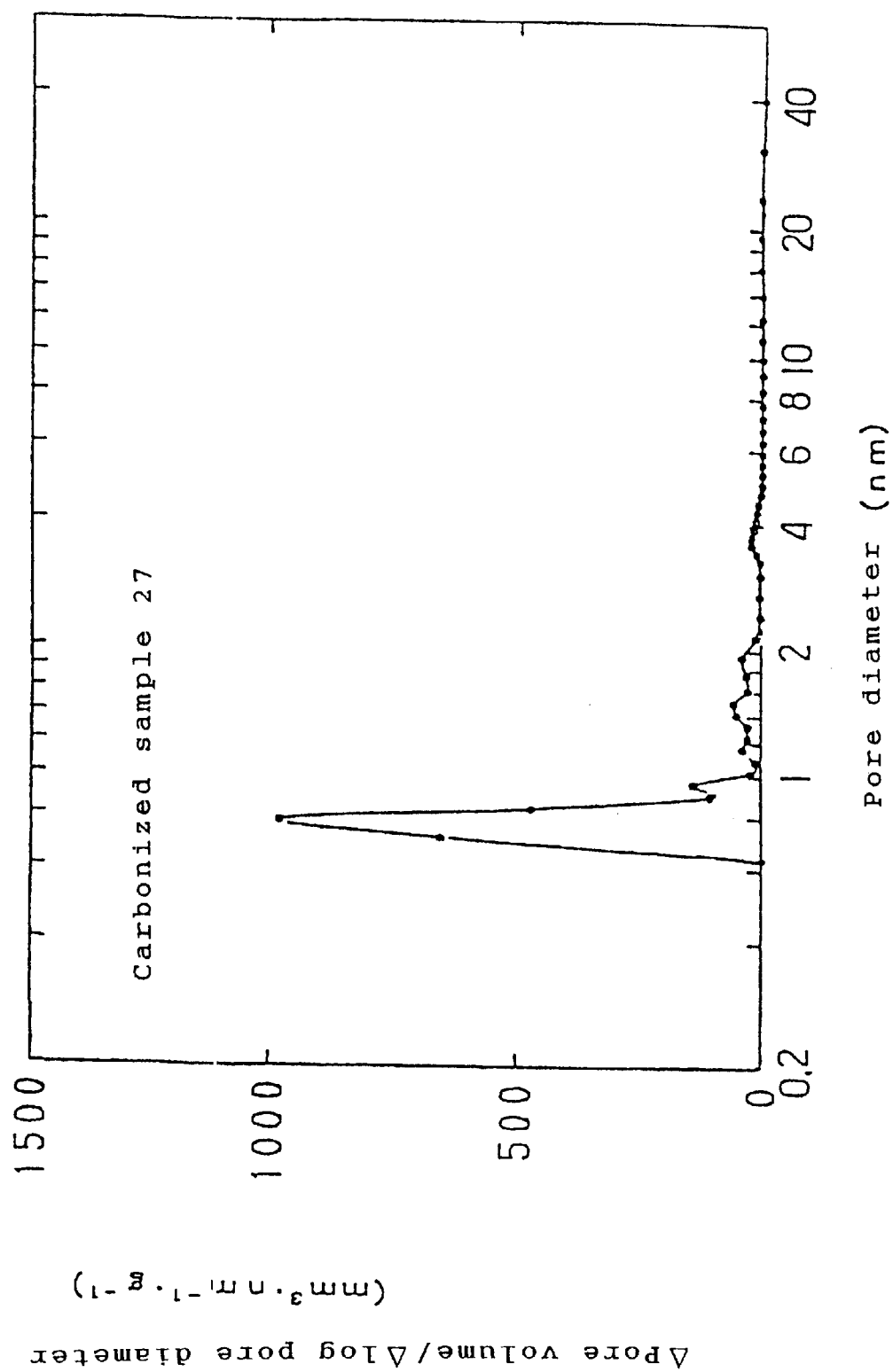

[Fig. 4]
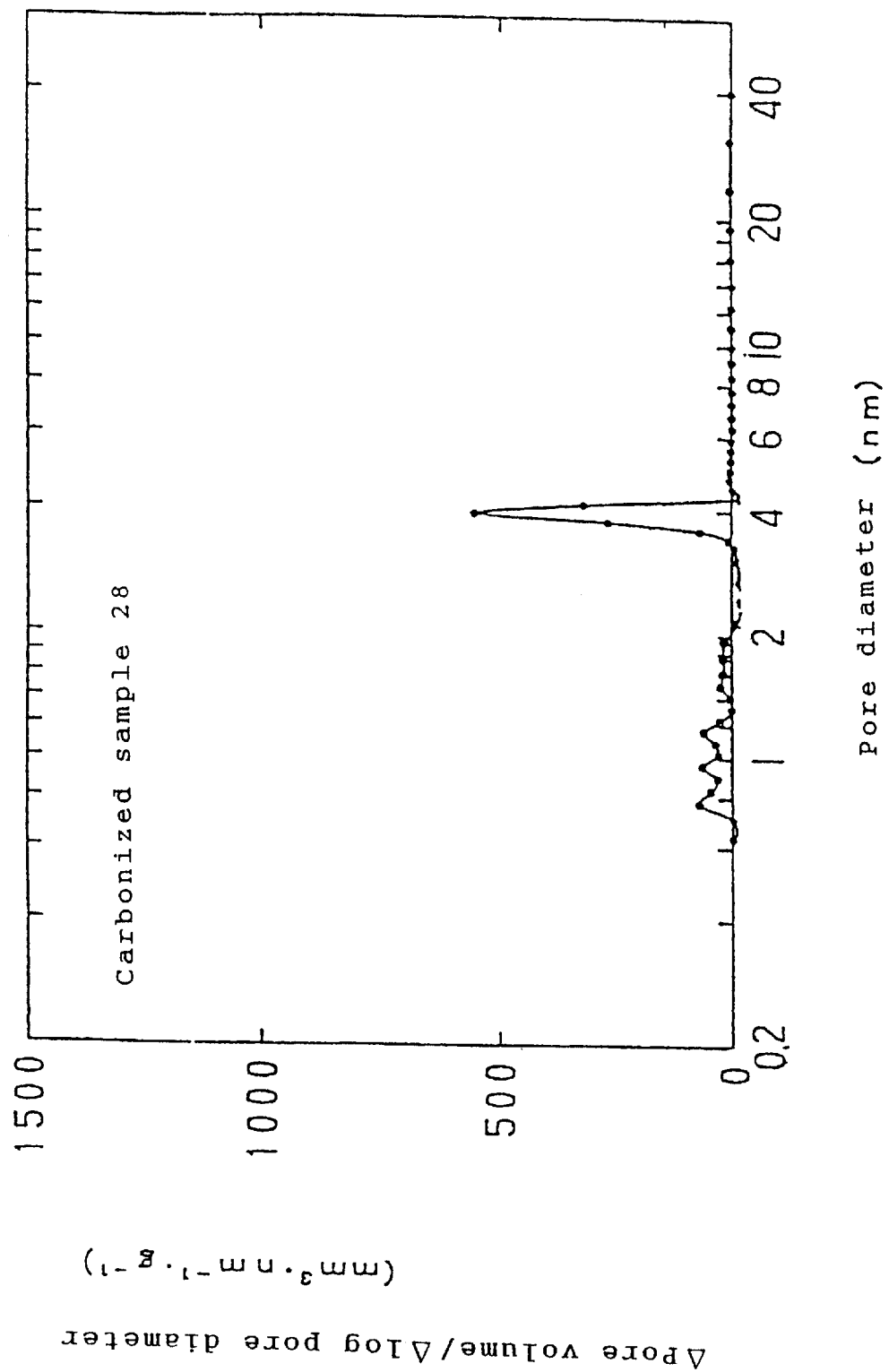

[Fig. 5]
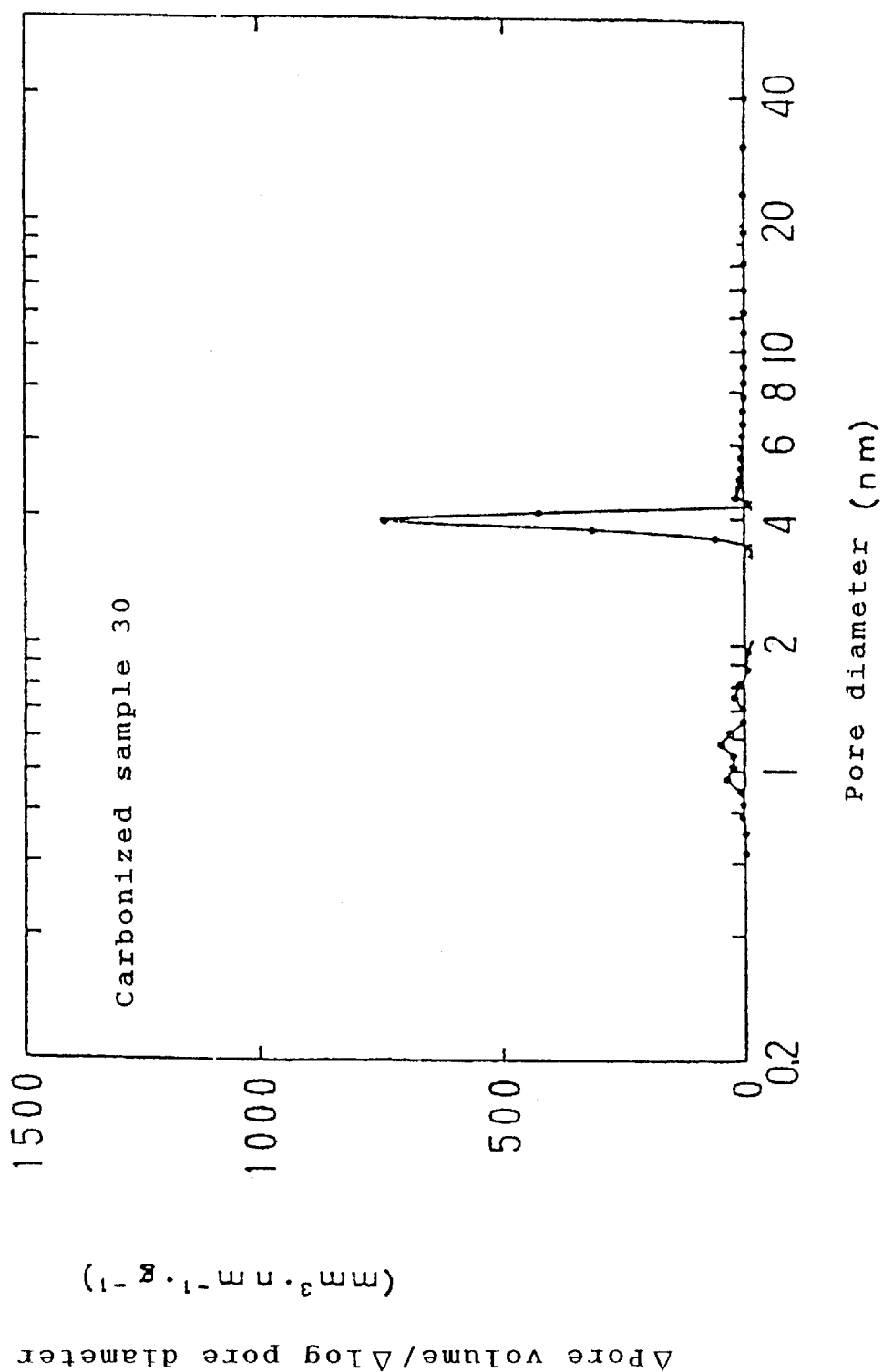

[Fig. 6]
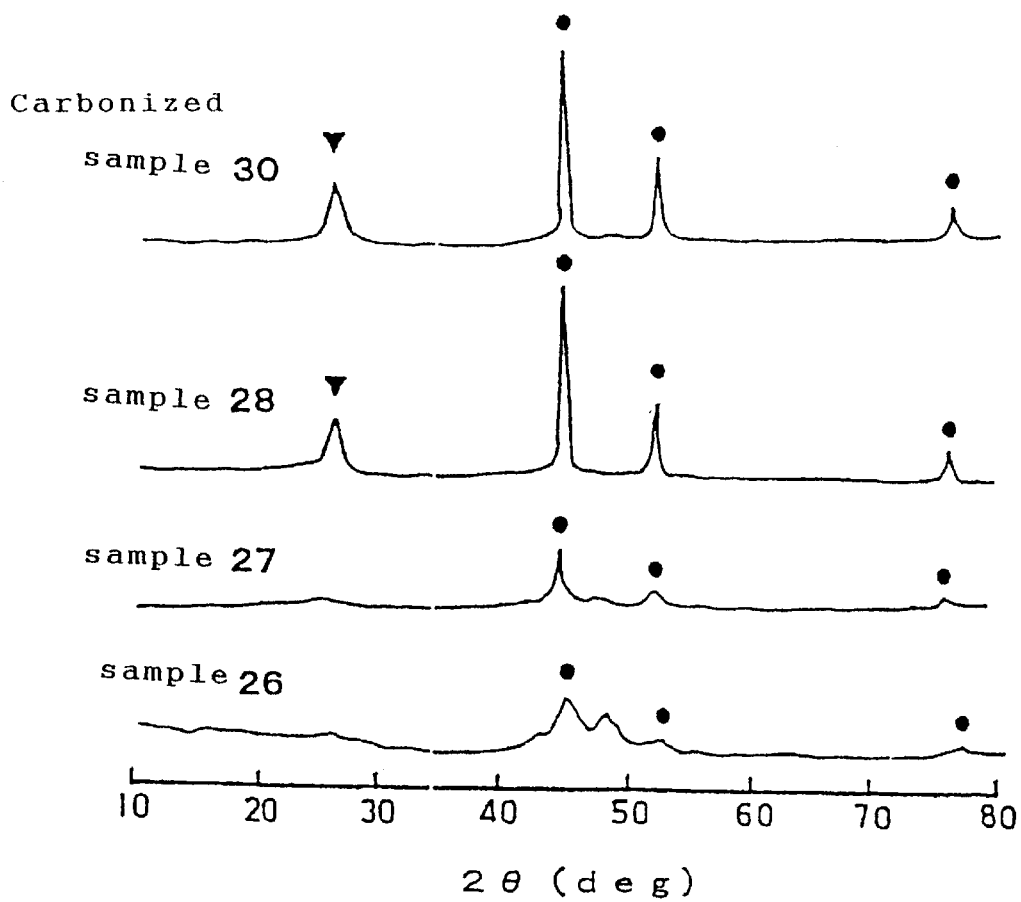
Symbol ● denotes a peak of Ni and symbol ▼ denotes a peak of graphite.

[Fig.7]
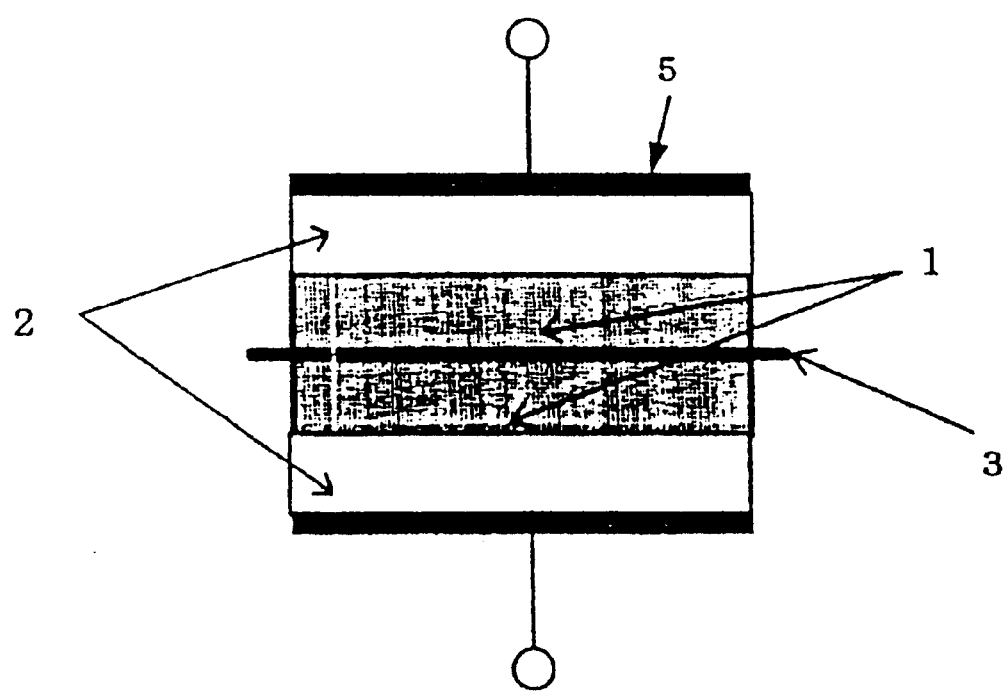

[Fig.8]
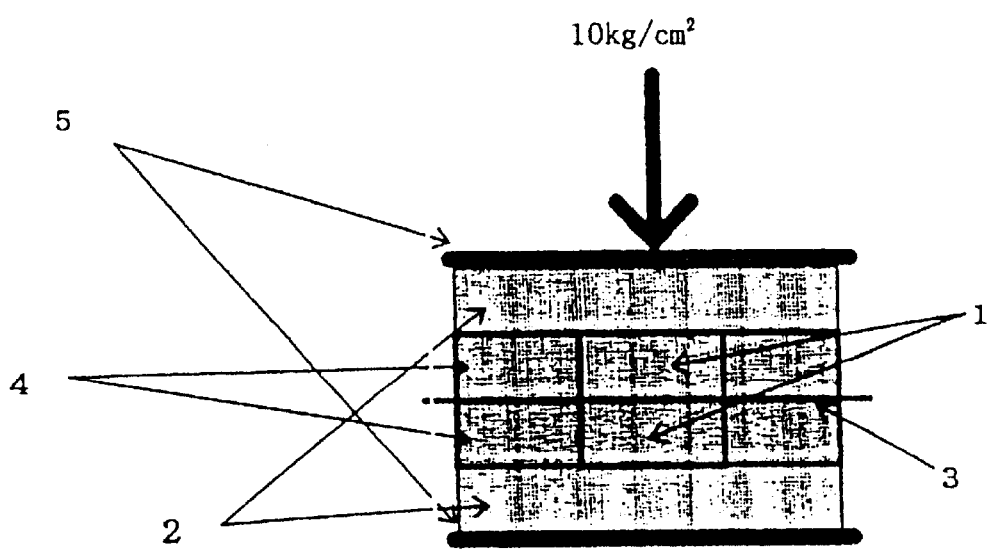

[Fig.9]
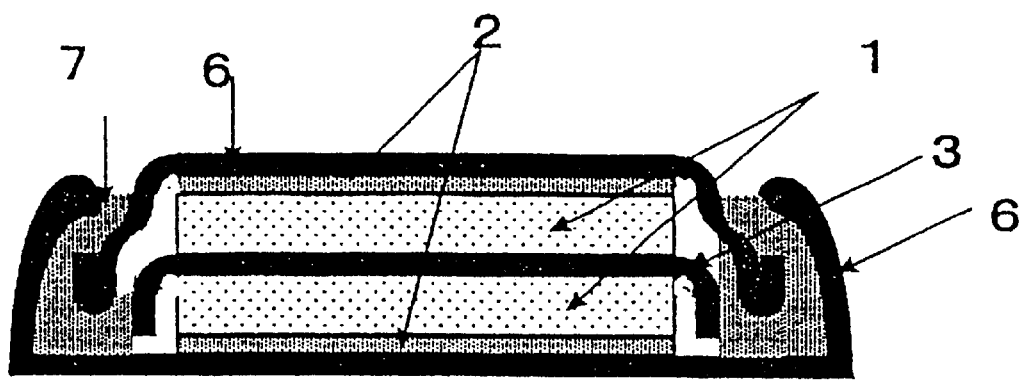

ELECTRODE MATERIAL AND METHOD FOR PRODUCING THE SAME

TECHNICAL FIELD

The present invention relates to an electrode material for a battery and electric double layer capacitor, a method of producing the same, a battery, and an electric double layer capacitor, particularly to an electrode material which is most suitable for forming an electric double layer capacitor having a large capacitance and large current discharge capability, and a method of producing the same.

BACKGROUND ART

As materials having the capacity to adsorb various substances or ions, for example, powdered activated carbon, granular activated carbon and fibrous activated carbon have been known and are widely used as electrode materials for various batteries, various adsorbents used in water purifiers, deodorization apparatuses, decoloration apparatuses or the like and catalyst carrier. These activated carbons are prepared by activating a carbon material mainly made from coconut shell, coal, lumber or bamboo as a raw material in the presence of steam or in the presence of zinc chloride or potassium hydroxide, and include numerous fine pores therein.

These fine pores are generally referred to as submicropores when the pore diameter is smaller than 0.7 nm, micropores when the pore diameter is within a range from 0.7 to 2.0 nm, mesopores when the pore diameter is within a range from 2.0 to 50 nm, and macropores when the pore diameter is 50 nm or larger.

According to a conventional method of preparing the activated carbon, although activated carbon including micropores having a pore diameter within a range from 0.7 to 2.0 nm and submicropores having a pore diameter smaller than 0.7 nm developed therein are made, formation of mesopores having a diameter within a range from 2.0 to 50 nm is insufficient and the volume of mesopores account for less than 10% of the total volume of pores. Such an activated carbon has a large specific surface area and excellent capability to adsorb molecules having a size smaller than 2.0 nm, but is not capable of efficiently adsorbing and desorbing an organic compound and an inorganic compound, which are used as an electrolyte of the electric double layer capacitor, and aggregates of larger size whichare formed through solvation of these substances.

In view of the adsorption and desorption properties appropriate for the molecule size of the adsorbed material, it is desirable to prepare an activated carbon that has pores of only a specific size. However, no adsorbent having a pore size distribution that is specific in a particular range of pore sizes has been obtained in the mesoscopic pore range.

Although such an activated carbon that supports transition metals or transition metal compounds and has a catalytic action to decompose a material adsorbed onto the activated carbon and electrode materials having a large capacitance have been reported no activated carbon-supported transition metal having a pore size distribution that is specific in a particular range of pore sizes has been obtained in the mesoscopic pore range, as described above. Also, because the activated carbon is processed to support the transit ion metal's or transition metal compounds by adsorption of the transition metals or transition metal compounds after the activated carbon has been prepared, in case the activated carbon is immersed in an electrolytic solution for use as an electrode material, for example, there is such a problem that the supported metal elutes. Therefore, an electrode material that has satisfactory electrical characteristics and stable charge and discharge characteristics has not been made available.

In recent years, demands for an electric double layer capacitor that utilizes activated carbon as the electrode material have been increasing as the backup power source, auxiliary power source and other uses, and are attracting much attention with the development of the electronics industry.

More recently, it has been called for to reduce the size of memory backup power sources further, and develop a secondary battery that can be used as an auxiliary power source having a large capacity and capability to supply a large current instantaneously such as the onboard power source for vehicles.

Activated carbon has a large specific surface area and high chemical stability, and therefore, electrode materials that consist mainly of activated carbon are used as both positive and negative electrodes, for the polarizing electrodes of an electric double layer capacitor.

While the capacitance of the electric double layer capacitor is dependent on the specific surface area, packing density and internal resistance of the electrode material and other factors, particularly important is the relationship between the size of the electrolyte ions included in the electrolytic solution that forms the electric double layer and the size of the pores formed in the electrode material.

In those that are referred to as the electric double layer capacitors of an organic solvent base that utilize an ammonium ion, phosphonium ion or the like, among the electric double layer capacitors, it is said that pores having a pore diameter of 2 nm or larger in the electrode material contribute to the capacitance. Also, in a water-based electric double layer capacitor that uses sulfuric acid as the electrolyte, it is believed that pores having a pore diameter of 2 nm or larger contribute to the performance such as capacitance and current density. Thus, it is expected that excellent materials for electrodes of an electric double layer capacitor or battery will be made from an activated carbon that includes pores having a pore diameter within a range of $X\pm\alpha$ nm ($3.0 \leq X < 10$, $\alpha=1.0$; range of pore size distribution) of which volume accounts for 15% or more of the total volume of mesopores having a pore diameter within a range from 2.0 to 50 nm.

When using a metal supporting activated carbon made by dispersing a large amount of a transition metal or a transition metal compound in an activated carbon as the electrode material, electrolyte that has migrated into the electric double layer is taken into the transition metal or transition metal compound that is present in the activated carbon, and therefore, a greater amount of energy can be stored in comparison to a case in which the electric double layer is used individually. Thus, an activated carbon that includes pores having a pore diameter within a range of $X\pm\alpha$ nm ($3.0 \leq X < 10$, $\alpha=1.0$; range of pore size distribution) of which volume accounts for 15% or more of the total volume of mesopores having a pore diameter within a range from 2.0 to 50 nm, and contains 0.01 to 50% by weight of a transition metal or a transition metal compound will make excellent electrodes for an electric double layer capacitor or a battery.

The thickness of the electric double layer formed from ions that are adsorbed onto the inner surface of pores in an electrode material is believed to be about 1 nm. Since the pore diameter must be 2 nm or larger in order to form the electric double layer evenly on the inner surface of the pores, a conventional activated carbon of which pores consist mainly of micropores having a pore diameter of 2 nm or less is not suited for use as an electrode material for large capacitance and large current discharge. Moreover, in a conventional activated carbon of which pores consist mainly of micropores having a pore diameter of 2 nm or less, the speed of migration,of the electrolyte ions generated through salvation becomes slower which is believed to make such an activated carbon unsuited for use as an electrode material for large capacitance and large current discharge.

Accordingly, an activated carbon, which is made by supporting a transition metal or transition metal compound on the conventional activated carbon of which pores consist mainly of micropores having a pore diameter of 2 nm or less, does not have such pores for the electric double layer to be formed evenly over the inner surface thereof, and the speed of the electrolyte ions to migrate in the pores becomes slower, and therefore, the activated carbon of the prior art is not capable of storing a large amount of energy in the transition metal or transition metal compound and efficiently utilizing the energy. These problems are believed to make the conventional activated carbon that supports the transition metal or transition metal compound unsuitable as the electrode material for large capacitance and large current discharge.

Meanwhile, metal-halogen batteries, for example, a zinc-bromine battery, have been vigorously developed for the reason of such excellent features as the active materials used to make both electrodes are available in abundance at a low cost, theoretical energy density is high, output of the battery can be easily controlled due to the liquid circulating operation, and maintenance work is made easy because the battery with aqueous solution which operates at a low temperature. An activated carbon has been examined as a promising candidate for the surface treating material of the positive electrode of these batteries. However, several problems must be solved before making practical use of such a battery. Among others, it is an important technical task to form pores, consisting mainly of mesopores having a pore diameter of 2 nm or larger, in the activated carbon used as the electrode material for the positive electrode, since the energy efficiency of a battery is directly affected by how fast and how efficiently the reducing reaction of halogen is carried out in the positive electrode during discharge.

Various attempts have been made to prepare adsorbents that make it possible to increase the pore diameter of the activated carbon and adsorb substances of relatively large molecule diameter. For example, there is a method of increasing the pore diameter by repeating the activation treatment many times. With this manufacturing method, however, the volume of pores in the mesoscopic range is a small proportion of the total volume of pores and the repetition of the activation treatment decreases the yield of production, and is therefore undesirable.

Unexamined Patent Publication (Kokai) No. Hei 5-302216 discloses a method of reforming carbonaceous fibers by treating the carbonaceous fibers having a specific surface area within a range from 0.1 to 1200 $m^2/g$ with an oxidizing agent to hydrophilize the fibers, supporting an alkaline earth metal on the fibers and subjecting them to an activation treatment. With this method, although pores having diameters within a range from 1.5 to 15 nm are formed, the volume of pores having a pore diameter within a range of $X\pm\alpha$ nm ($3.0\leq X<10$, $\alpha=1.0$; range of pore size distribution) does not account for 15% or more of the total volume of mesopores having a pore diameter within a range from 2.0 to 50 nm, and the microscopic structure of the carbon material is not strictly controlled. Such a carbon material has such drawbacks as a broad distribution of a pore diameter, while a significant proportion of the pores are those having diameters not effective for adsorption which leads to lower adsorption efficiency, thus decreasing the fiber density and the strength.

Unexamined Patent Publication (Kokai) No. Hei 5-000811 discloses an activated carbon material which is made from protein, sludge or waste including protein, or activated carbon in the form of polyacrylonitrile fibers. As such, the material contains a large amount of impurities. Also because the material is simply carbonized, or an activation treatment is carried out only by means of steam, carbon dioxide gas, oxygen, etc., the pore diameter is not strictly controlled. Further, because of the low impurity of the carbon, the material has a low electrical conductivity and is not suited for use as an electrode material.

Unexamined Patent Publication (Kokai) No. Hei 5-294607 discloses a method of preparing a metal-containing activated carbon by subjecting a mixture of pitch having a low softening point and a metallic compound to a carbonization or activation treatment. According to this method, there could not be obtained a material that includes pores having a pore diameter within a range of $X\pm\alpha$ nm ($3.0\leq x<10$, $\alpha=1.0$; range of pore size distribution) of which volume accounts for 15% or more of the total volume of mesopores having a pore diameter within a range from 2.0 to 50 nm. This method is also not economically feasible due to a high material cost because a rare earth compound such as a ytterbium compound and/or yttrium compound are used.

An energy storing element disclosed in Unexamined Patent Publication (Kokai) No. Hei 4-294515 and a super capacitor disclosed in Unexamined Patent Publication (Kokai) No. Hei 6-503924 are both produced by bonding a transition metal or a transition metal compound to a porous carbon material such as activated carbon, but are not an electrode material that includes pores having a pore diameter within a range of $X\pm\alpha$ nm ($3.0\leq X<10$, $\alpha=1.0$; range of pore size distribution) of which volume accounts for 15% or more of the total volume of mesopores having a pore diameter within a range from 2.0 to 50 nm, and are not suited for electrode material for large capacitance and large current discharge. Moreover, since a significant amount of the transition metal or transition metal compound is bonded to the porous carbonaceous material such as activated carbon, by the method described in the publication mentioned above, when the porous carbonaceous material is brought into contact with a high concentration solution of the transition metal or transition metal compound, the transition metal or transition metal compound cannot be dispersed sufficiently, resulting in the coagulation of the transition metal or transition metal compound. This leads to such problems as micropores of the porous carbonaceous material are clogged, or the transition metal or transition metal compound that is merely adsorbed physically onto the surfaces of the pores in the porous carbonaceous material dissolves into the electrolyte, and consequently these materials do not have sufficient performance when used as the electrode material for the electric double layer capacitor.

As described above, according to the conventional methods of forming pores in the mesoscopic range, there have never been obtained an electrode material that includes pores having a pore diameter within a range of $X\pm\alpha$ nm ($3.0\leq X<10$, $\alpha=1.0$; range of pore size distribution) of which volume accounts for 15% or more of the total volume of mesopores having a pore diameter within a range from 2.0 to 50 nm and strict control of the a pore diameter has not been achieved. Accordingly, there has never been obtained an electrode material that includes pores having a pore diameter within a range of X±α nm (3.0≦X<10, α=1.0; range of pore size distribution) of which volume accounts for 15% or more of the total volume of mesopores having a pore diameter within a range from 2.0 to 50 nm, on which the transition metal or transition metal compound is supported. The present invention has been made to solve the problems described above, and an object thereof is to provide an electrode material that includes pores having a pore diameter within a range of X±α nm (3.0≦X<10, α=1.0; range of pore size distribution) of which volume accounts for 15% or more of the total volume of mesopores having a pore diameter within a range from 2.0 to 50 nm, while having pore size distribution with the maximum value in the range, preferably having a diffraction peak originated in a graphite crystal in X-ray diffraction and contains 0.01 to 50% by weight of the transition metal or transition metal compound. Other objects of the present invention are to provide a method of producing the electrode material described above, and a battery or electric double layer capacitor that employs the electrode material.

DISCLOSURE OF THE INVENTION

The present inventors have intensively studied to solve the problems described above and found it possible to obtain an electrode material that includes pores having a pore diameter within a range of X±α nm (3.0≦X<10, α=1.0; range of pore size distribution) of which volume accounts for 15% or more of the total volume of mesopores having a pore diameter within a range from 2.0 to 50 nm by adding at least one transition metal or at least one transition metal compound to a carbon material and/or a carbon material precursor, followed by carbonization in a non-oxidizing atmosphere or activation in a slightly oxidizing atmosphere at a temperature higher than 600° C., thus completing the present invention. Also the present inventors have found it possible to provide an electrode material that has a maximum value of pore size distribution in the range described above and has a diffraction peak originated in a graphite crystal in X-ray diffraction, while containing 0.01 to 50% by weight of the transition metal or transition metal compound, thus completing the present invention.

That is, the present invention provides an electrode material that includes pores having a pore diameter within a range of X±α nm (3.0≦X<10, α=1.0; range of pore size distribution) of which volume accounts for 15% or more of the total volume of mesopores having a pore diameter within a range from 2.0 to 50 nm. The present invention also provides an electrode material that has a maximum value of pore size distribution in the range described above and has a diffraction peak originated in a graphite crystal in X-ray diffraction. The present invention further provides an electrode material that contains 0.01 to 50% by weight of the transition metal or transition metal compound. The present invention still further provides a method of producing the electrode materials, an electric double layer capacitor that has large capacitance and is capable of discharging large current and a battery of large capacity.

While the mechanism of forming the mesopores in the electrode material of the present invention has not yet been elucidated, it is presumed that the carbon skeleton surrounding the transition metal is once destroyed by the catalyst action of the transition metal during heat treatment, and the rate of reaction between the activation gas and the carbon increases significantly leading to a condition similar to erosion by the transition metal, so that the formation, expansion and congregation of the pores proceed and result in the formation of mesopores. Size of the mesopores thus formed seems to be related to the size of the transition metal atom. Partial formation of graphite crystal is also considered to occur due to the rearrangement of.:the atoms during formation of the mesopores.

BRIEF DESCRIPTION OF THE DRAWINGS

FIG. 1 is a graph showing the pore size distribution of samples 1, 2, 3 and 5 according to the present invention.

FIG. 2 is a graph showing the pore size distribution of a sample 26 according to the present invention.

FIG. 3 is a graph showing the pore size distribution of sample 27 according to the present invention.

FIG. 4 is a graph showing the pore size distribution of a sample 28 according to the present invention.

FIG. 5 is a graph showing the pore size distribution of a sample 30 according to the present invention.

FIG. 6 is a graph showing the X-ray diffraction pattern of samples 26, 27, 28 and 30 according to the present invention.

FIG. 7 is an explanatory drawing of the electric double layer capacitor according to the present invention.

FIG. 8 is an explanatory drawing of the electric double layer capacitor employing aqueous electrolyte used in the evaluation of the electrode material according to the present invention.

FIG. 9 is an explanatory drawing of the electric double layer capacitor employing organic electrolyte used in the evaluation of the electrode material according to the present invention.

In the drawings, reference numeral 1 denotes an electrode material, 2 denotes a current collector, 3 denotes a separator, 4 denotes a spacer, 5 denotes a terminal plate, 6 denotes a casing, and 7 denotes a packing.

BEST MODE FOR CARRYING OUT THE INVENTION

The electrode material of the present invention has a pore size distribution in a specific range and is therefore capable of quickly adsorbing and desorbing ions of electrolyte and the like and shows a high adsorption capacity for these substances, when used in an electric double layer capacitor, battery or the like. The volume of pores having a pore diameter within a range of X±α nm (3.0≦X<10, α=1.0, range of pore size distribution) is preferably within a range from 0.010 to 0.50 $cm^3/g$, more preferably within a range from 0.050 to 0.50 $cm^3/g$, and most preferably within a range from 0.10 to 0.50 $cm^3/g$. In case the volume of pores in this range is less than 0.010 $cm^3/g$, the adsorption capacity for the electrolyte ions decreases and the capacitance also decreases, which is not desirable. The volume of pores in this range also accounts for 15% or more of the total volume of mesopores having a pore diameter within a range from 2.0 to 50 nm, preferably accounts for 20 to 95%, and more preferably 30 to 95%. In case the volume of pores in this range accounts for less than 15% of the total volume of mesopores having a pore diameter within a range from 2.0 to 50 nm, the capacitance and adsorption/desorption rate for the electrolyte ions decrease, which is not desirable.

The electrode material of the present invention also has, in addition to the features described above, a diffraction peak originated in the plane (00.2) of a graphite crystal in the vicinity of $2\pi=26°$ in the X-ray diffraction pattern observed with Cu—K α line. The electrode material of the present invention is also characterized preferably in that a part of the carbon material is graphitized even when a non-graphitizable carbon or a precursor thereof is used as the starting material. The fact that the diffraction peak originated in a graphite crystal is observed means that the carbon material is at least partially graphitized, and it is assumed that the pore size distribution has become sharper due to an improvement in the crystallinity.

It is considered that electrical conductivity is also improved, making a contribution to the reduction of internal resistance of the electric double layer capacitor. While the non-graphitizable carbon is usually difficult to be graphitized, even when subjected to a heat treatment at a temperature of 2000° C. or higher, it can be graphitized relatively easily according to the present invention, thus contributing to the improvements in the characteristics such as homogeneity of pore size distribution, electrical conductivity and heat conductivity.

The carbon content of the electrode material of the present invention is preferably 90% by.weight or more, more preferably 93% by weight or more, and most preferably 95% by weight or more. When the carbon content is 90% by weight or higher, formation of pores proceeds due to carbonization and leads to an increase in capacitance and, since characteristics required of a carbonaceous electrode material are achieved, such as excellent electrical conductivity, corrosion resistance and heat conductivity, the electrode material of the present invention has a low internal resistance and is particularly preferably used in the electric double layer capacitor. The nitrogen content is preferably below 1% by weight in view of the capacitance and electrical conductivity.

The electrode material of the present invention further contains the transition metal or transition metal compound in the amount within a range from 0.01 to 50% by weight, preferably from 0.1 to 20% by weight and more preferably 1 to 10% by weight based on the total weight. When the content of the transition metal or transition metal compound is less than 0.01% by weight, a sufficient amount of electrolyte cannot be incorporated, thus making it impossible to obtain an electrode material having a large capacitance. When.the content of the transition metal or transition metal compound is greater than 50% by weight, micropores and mesopores of the activated carbon are c logged thus making it impossible to obtain an electrode material having a.large capacitance.

The electrode material of the present invention can be used in various forms such as powder, granule, cylinder, sphere, crushed pieces, porous block and sheet, in accordance to such factors as the place and condition of use. In the case of powder, a mean particle size is usually within a range from 0.10 to 200 μm, preferably from 1.0 to 10.0 μm, and more preferably from 5 to 50 μm, and the bulk density of particles is within a range from 0.7 to 2.3 g/cm$^3$, and preferably from 0.8 to 1.8 g/c m$^3$ though not strictly limited.

In the case of crushed pieces, the carbon material has undefinable shapes generated by crushing an ion exchange resin, coconut shells, coal or the like that has been carbonized, having a mean particle size preferably within a range from 1 to 100 μm, and preferably from 5 to 50 μm, a bulk density of particles within a range from 0.7 to 2.3 g/cm$^3$ or preferably from 0.8 to 1.8 g/cm$^3$, though not strictly limited.

The specific surface area of the electrode material of the present invention is preferably within a range from 100 to 2500 m$^2$/g, more preferably within a range from 200 to 2300 m$^2$/g, and most preferably within a range from 300 to 2000 m$^2$/g, though not strictly limited.

The present invention also provides a method of producing the electrode material described above. According to the method of the present invention, the electrode material can be produced by adding at least one transition metal or at least one transition metal compound to a carbon material or a carbon material precursor, and carbonating in a non-oxidizing atmosphere or activating in a slightly oxidizing atmosphere at a temperature of 600° C. or higher. The carbon material used in the production of the electrode material of the present invention is preferably coconut shell charcoal, cokes, wooden charcoal, carbonized resin or bamboo. As the carbonized resin, for example, carbonized ion exchange resin or carbonized phenolic resin can be preferably used. The specific surface area of the carbon material is not limited, but may be smaller than 30 m$^2$/g.

The carbon material precursor used in the production of the electrode material of the present invention is preferably coconut shell, coal, wooden material, bamboo or resin. As the wooden material, for example, lumber of broadleaf tree or conifer, waste or sawdust thereof may be preferably used. While there is no limitation to the resin used as the precursor of the resin carbide, besides various ion exchange resins, thermosetting resins such as phenolic resin, melamine resin, urea resin and furan resin are preferably used.

Phenolic resins are roughly divided into resol resin, novolak resin, other special phenolic resin and modified phenolic resins. A melamine resin is a transparent and colorless water-soluble resin made by reacting melamine with aldehyde, normally formaldehyde, in the presence of a basic catalyst. A urea resin is a transparent-and colorless water-soluble resin made by reacting urea with formaldehyde in the presence of an acidic catalyst or a basic catalyst. A furan resin is an initial condensate of furfuryl alcohol, furfural resin or a modified resin thereof.

As the thermosetting resin used in the present invention, a phenolic resin is preferable for the reason of the ease of handling in the production, high yield of carbonization and the ease of controlling the pores, and particularly granular phenolic resin described below is most preferable.

The granular phenolic resin is, as disclosed in Examined Patent Publication (Kokoku) No. Sho 62-30210 or Examined Patent Publication (Kokoku) No. Sho 62-30212, a granular resin containing a condensate of phenol and aldehyde as principal component. A granular phenolic resin that satisfies the following conditions is particularly preferable: (A) spherical primary particles of a particle diameter within a range from 0.1 to 150 μm and secondary coagulate thereof are contained; (B) at least 50% by.weight of the total amount consists of particles that can pass a sieve of mesh size 150 μm; (C) methanol solubility as defined in the body text of the specification is 50% by weight or less; and (D) free phenol content is 100 ppm or lower as measured by liquid chromatography.

Although the ion exchange resin as the carbon material precursor used in the present invention is not specifically limited, there can be used a gel, porous or high-porous type strong acid cation exchange resin containing a styrene-divinylbenzene as a base, or a porous or high-porous chelate resin prepared by imparting a functional group such as iminodiacetic group, polyamine group, amino group, phosphoric group, dithiocarbamide group, oxime group or the like to a styrene, acrylic or phenol polymer base.

The cation exchange resin is a polymeric acid prepared by bonding a parent synthetic resin with an acidic group such as acidic hydroxyl group, carboxyl group, sulfone group or the like and is capable of ion-exchanging with a transition metal ion in a solution and supporting a large amount of transition metal ions by dispersion and, therefore it can be preferably used as the carbon material precursor.

According to the present invention, the electrode material can be produced by adding at least one transition metal or at least one transition metal compound, in the amount of preferably within a range from 0.01 to 100 parts by weight, more preferably from 0.05 to 80 parts by weight, and most preferably from 2 to 60 parts by weight, based on 100 parts by weight of the carbon material or carbon material precursor, and carbonizing or activating at a temperature of 600° C. or higher.

At least one transition metal or at least one transition metal compound is preferably metal powder or one or more kinds of nitrate, acetate, sulfate, carbonate, bromide, chloride, oxide and hydroxide of a metal. In case the metal is in powdered form, at least 95% by weight of the total amount preferably consists of particles that can pass a sieve of mesh size 150 μm, and more preferably the powder has a mean particle size of 0.3 μm. In case any of nitrate, acetate, sulfate, carbonate, bromide, chloride, oxide and hydroxide of a metal is added, it may be in the form of an aqueous solution or a solution of a polar solvent such as methanol, so that an appropriate concentration that allows easy handling during the production can be obtained. For example, such transition metals as Cu, Fe, Co, Ni, Ti, Cr, Mn and W are preferably used.

The method of adding the transition metal or transition metal compound to the carbon material or the carbon material precursor according to the present invention may be as follows. In the case of metal powder, for example, the powder may be simply mixed with a predetermined amount of the carbon material or the carbon material precursor. In the case of a compound of the transition metal, an aqueous solution or a solution of polar solvent such as methanol of a predetermined amount of the metal compound may be added to the carbon material or the carbon material precursor and mixed therewith. Addition may be done either by adding 200 to 500 parts by weight of the solution of a low concentration in proportion to the carbon material or the carbon material precursor which is then mixed in a state of slurry, dried so as to remove the solvent, and subjected to carbonization or activation treatment, or by adding 5 to 100 parts by weight of the solution to the carbon material or the carbon material precursor which is then kneaded and mixed in a state of paste, dried so as to remove the solvent, and subjected to carbonization or activation treatment.

In case each metal powder is added to the carbon material precursor, a predetermined amount of the powder is simply mixed with the carbon material precursor. When each metallic compound is added, such an amount of the metallic compound is added as a predetermined amount of the transition metal is contained in proportion to the carbon material precursor. In case the carbon material precursor is soluble in a high polar solvent such as water or methanol, the material is dissolved in an aqueous solution or a solution of polar solvent such as methanol, which is then mixed with a solution of the carbon material precursor. The mixture thus obtained is dried and is then subjected to a carbonization or activation treatment.

According to the present invention, since the transition metal or transition metal compound is added to the carbon material or the carbon material precursor before subjecting it to the carbonization or activation treatment, it is believed that all or part of the transition metal or transition metal compound is firmly embedded in the carbon skeleton of the activated carbon, unlike the case of having the transition metal or transition metal compound supported on the activated carbon through adsorption. As a consequence, elution of the transition metal or transition metal compound hardly occurs, even when the activated carbon is immersed in an electrolyte for use as the electrode material. In case the elution becomes a problem, it is preferable to use the electrode material after removing the transition metal or transition metal compound that is expected to easily elute by the pickling process to be described later.

Methods of adding the transition metal compound to the ion exchange resin according to the present invention may be, for example, by using ion exchange in a column process where a solution including the transition metal ions is passed through an ion exchange resin packed in a column, or by means of ion exchange through immersion where an ion exchange resin is immersed in an aqueous solution that contains various transition metalions. These methods are preferable for preparing the carbon precursor employed in the present invention, since a large amount of the transition metal can be supported on the resin in a high-dispersion state.

The electrode material of the present invention can be produced either by carbonizing the carbon material or the carbon material precursor having at least one transition metal or at least one transition metal compound added thereto in a non-oxidizing atmosphere at a temperature of 600° C. or higher, preferably within a range from 700 to 2000° C., more preferably within a range from 800 to 1500° C. or activating in slightly oxidizing atmosphere at a temperature of 600° C. or higher, preferably within a range from 700 to 1500° C., more preferably within a range from 800 to 1200° C., after the completion of the carbonization. When the carbonization temperature is lower than 600° C., formation of pores by the transition metal does not proceed, thereby making it impossible to obtain electrode material that includes pores having a pore diameter within a range of $X \pm \alpha$ nm ($3.0 \leq X < 10$, $\alpha = 1.0$; range of pore size distribution) of which volume accounts for 15% or more of the total volume of mesopores having a pore diameter within a range from 2.0 to 50 nm. Also because the material is not sufficiently carbonized and pores are not formed sufficiently, the electrical conductivity is low while heat resistance and chemical resistance are also insufficient. When this material is used as the electrode material of the electric double layer capacitor, the capacity to adsorb electrolyte ions and adsorption/desorption rate are low, resulting in small capacitance, which is not suitable for discharging large current.

The non-oxidizing atmosphere refers to an atmosphere that contains nitrogen, helium, argon, hydrogen or carbon monoxide in the form of a gas, with substantially no oxidizing gas being included. The slightly oxidizing atmosphere refers to an atmosphere that contains steam and carbon dioxide as major gaseous components, while an atmosphere that includes nitrogen, helium, argon, hydrogen or carbon monoxide as a part also is included in the scope of the present invention.

Although there is no limitation to the heating rate used to reach the maximum processing temperature in the carbonization and activation treatments, the rate is preferably within a range from 5 to 500° C./H and most preferably within a range from 10 to 300° C./H. The atmosphere in which carbonization is carried out, the heating rate, the maximum temperature and the maximum temperature holding period are optimally determined by giving consideration to the type and pore structure of the carbon material, type and characteristic of the carbon material precursor, pore structure of the target electrode material and other factors. It is usually desirable to heat to a high temperature in order to form pores, although an excessively high maximum temperature makes the pores too small and decreases the volume of pores, thus leading to undesirable electrode characteristics.

While it is preferable to control, as required, the content of the transition metal in the electrode material that is produced through the carbonization and activation, in this case a predetermined content of the transition metal is achieved by combining neutralization with an aqueous solution of, ammonia or the like and washing with water, deionized water, distilled water and ultra pure water, after pickling with dilute hydrochloric acid, dilute nitric acid or the like. Decomposition of the electrolytic solution may be accelerated depending on the transition metal that is contained, thus leading to deterioration of cycle characteristic due to increased inner pressure of the capacitor because of the generation of decomposition gas. In order to prevent such a trouble, it is preferable to carry out sufficient washing.

The electrode material of the present invention is in various forms such as powder, granule, crushed pieces, cylinder, sphere, porous block or sheet, and includes pores having a pore diameter within a range of $X \pm \alpha$ nm $3.0 \leq X < 10$, $\alpha = 1.0$; range of pore size distribution) of which volume accounts for 15% or more of the total volume of mesopores having a pore diameter within a range from 2.0 to 50 nm. Also the electrode material has a maximum value of the pore size distribution in the range described above and a diffraction peak originated in a graphite crystal in X-ray diffraction, and also contains 0.01 to 50% by weight of the transition metal or transition metal compound.

The present invention also provides a battery and an electric double layer capacitor that employ the electrode material described above. The electric double layer capacitor basically employs an electrode material 1 and a current collector 2 as unit polar electrodes as.shown in FIG. 7, and comprises these two polar electrodes and a separator 3 that is interposed between these electrodes and is immersed in an electrolytic solution, while a plurality of the units are connected in parallel or in series as required.

The separator comprises a porous sheet that is resistant to the electrolysis, while a porous sheet or nonwoven fabric made of polyethylene, Teflon, polypropylene or the like is preferably used.

The electrolytic solution of the electric double layer capacitor requires high electrochemical stability over a wide temperature. As the solvent, for example, there can be used propylene carbonate, ethylene carbonate, butylene carbonate, gamma-butyrolactone, N,N-dimethylformamide, sulfolane, 3-methylsulfolane and the like. As the solute, for example, there can be used $LiBF_4$, $Me_4NBF_4$, $Et_4NBF_4$, $LiPF_6$, $Me_4NPF_6$, $Et_4NPF_6$, $LiClO_4$, $Me_4NClO_4$, $Et_4NClO_4$, $H_2SO_4$ and the like. When the electrolytic solution is a non-aqueous one, it is necessary to pay special attention to water content. The electrode material and separator must be sufficiently impregnated with the electrolytic solution by means of vacuum or heating impregnation.

The electrode material of the present invention includes pores having a pore diameter within a range of $X \pm \alpha$ nm $(3.0 \leq X < 10$, $\alpha = 1.0$; range of pore size distribution) of which volume accounts for 15% or more of the total volume of mesopores having a pore diameter within a range from 2.0 to 50 nm, and has a maximum value of the pore size distribution in the range described above and a diffraction peak originated in a graphite crystal in X-ray diffraction, and also contains 0.01 to 50% by weight of the transition metal or transition metal compound. Therefore, the electrode material has high adsorption/desorption rate and large adsorption capacity for organic compound and inorganic compound, and particularly for the aggregates of electrolyte ions having a larger molecule size being formed through salvation of these substances. Also because of good electrical conductivity, the electrode material makes it possible to increase the capacitance and.discharge current density when used as the electrode material of the electric double layer capacitor, a metal-halogen battery or the like, and is very useful as the electrode material of the electric double layer capacitor, metal-halogen battery or the like.

Measurement Method

Pores of porous materials such as carbon and ceramics are usually measured by various gas adsorption methods and mercury penetration method, which are selected in accordance to the size of the pores to be measured. Details of the measurement method and analysis will be described later. The electrode material of the present invention includes pores having a pore diameter within a range of $X \pm \alpha$ nm. $(3.0 \leq X < 10$, $\alpha = 0$; range.of pore size distribution) of which volume accounts for 15% or more of the total volume of mesopores having a pore diameter within a range from 2.0 to 50 nm, while the volume of pores having a pore diameter within a range from 0.7 to 50 nm including the range described above is usually analyzed by means of nitrogen adsorption method at the liquid nitrogen temperature.

Pore size distribution, pore volume and specific surface area of the electrode material of the present invention were measured by means of nitrogen adsorption method at the liquid nitrogen temperature using an full-automatic gas adsorption measuring instrument BELSORP28 (manufactured by BELJAPAN, Inc.). The volume of pores having a pore diameter within a range from 2.0 to 50 nm was determined by Dollimore-Heal's method. According to this method, the pore size distribution is determined by using an isothermal adsorption/desorption curve on the assumption that the pores have a cylindrical shape.

The procedure will be briefly described below.

1) Measurement of Pore Size Distribution and Pore Volume

The diameter of a cylindrical pore is given by equation (1).

$$rp=t+rk \quad (1)$$

where rp is a radius of pore, rk is a core radius of the meniscus, and t is a thickness of the adsorbed layer under the pressure p.

The thickness of the adsorbed layer is determined from t-plot of a standard sample and the radius of core is determined from Kelvin's equation (2).

$$ln(p/p0)=-(2\gamma VL/rm\ RT)\cos\theta \quad (2)$$

where p is an equilibrium pressure, p0 is a saturated vapor pressure, γ is a surface tension of the liquid, VL is a molar volume of the liquid, rm is a radius of the meniscus, R is a gas constant, T is a measurement temperature, and θ is a contact angle between the liquid and pore.

The value of rk is given as follows for nitrogen at the liquid nitrogen temperature when it is assumed that the radius of the meniscus during adsorption/desorption is equal to the core radius.

$$rk(\text{nm})=0.4078/\log(p0/p) \quad (3)$$

The pore size distribution and the volume of pores having a pore diameter within a range from 2.0 to 50 nm were determined by the methods described above.

2) Measurement of Specific Surface Area

Measurements of an isothermal nitrogen adsorption curve at the liquid nitrogen temperature were substituted in equation (4), to determine the amount of mono-molecular layer adsorption, and a BET multi-point method was employed to determine the specific surface area from the molecule-occupied area of nitrogen (0.162 $nm^2$).

$$p/v(p0-p)=(1/vmC)+\{(C-1)/vmC\}(p/p0) \quad (4)$$

$$S=vm \cdot \sigma N \quad (5)$$

where p is an equilibrium pressure, p0 is a saturated vapor pressure, v is an amount of adsorption at the equilibrium pressure p, vm is an amount of mono molecular layer adsorption, C is a constant, S is a specific surface area, and σN is a monomolecule-occupied area of nitrogen.

3) X-ray Diffraction Measurement with Cu—Kα Line

X-ray diffraction measurement of the electrode material made as a sample was carried out by powder reflection method with an X-ray diffraction instrument RINT-1400 (manufactured by RIGAKU CORPORATION) using a Cu—Kα for the bulb and a graphite monochrometer.

4) CHN Elemental Analysis

Trace organic elemental analysis was carried out using CHN coder MT-5 (manufactured by YANAGIMOTO MFG. CO, LTD.). The concentration of the transition metal or transition metal compound that was supported was determined by ICP measurement, which was substituted with the result being assumed as the total element contents, which is set to 100%.

5) Measurement of Concentration of Transition Metal or Transition Metal Compound About 1 g of a sample, that has been dried at 105° C. for two hours, is precisely weighed and charged into a platinum crucible, heated at 700° C. for two hours, to thereby turn into ash, which is heated on a hot plate after adding about 1 to 2 ml of hydrofluoric acid. Before the sample is concentrated to dryness, nitric acid is added to the sample, which is then diluted 7 to 8 times with ultra pure water. When the liquid amount has reduced to about ⅓, ultra pure water is added again. After adding about 1 ml of nitric acid and heating for one hour, ultra pure water is added to make 50 ml. A blank is made in the same operation to correct the results of measurements of the samples. The determination was carried out using the solution described above, by ICP emission spectrochemical analysis using a dual monochromatic ICP emission spectrophotometer, model P-5200, manufactured by Hitachi Limited.

6) Measurement of Capacitance

① Evaluation Using Aqueous Electrolyte

The capacitance of the water-based electric double layer capacitor fabricated in the Examples was measured. A voltage of 0.9 V was applied between both electrodes of the electric double layer capacitor to charge the capacitor with the constant voltage for 6 hours. Then the capacitor was discharged with a constant current of 100 $\mu A$, and the capacitance of the electric double layer capacitor was determined from the time required for the voltage to decrease from 0.54 V to 0.45 V. From the capacitance of the electric double layer capacitor and the weight of one set of polar electrodes, capacitance per unit weight of the electrode material was determined. Stability of the charge and discharge cycles was evaluated by repeating this measurement.

② Evaluation Using Organic Electrolyte

The capacitance of the organic-based electric double layer capacitor fabricated in the Examples was measured. A voltage of 4.0 V was applied between both electrodes of the electric double layer capacitor. Then the capacitor was discharged with a constant current of 5 mA, and the capacitance of the electric double layer capacitor was determined. From the capacitance of the electric double layer capacitor and the weight of one set of polar electrodes, capacitance per unit weight of the electrode material was determined. Stability of the charge and discharge cycles was evaluated by repeating this measurement.

7) Measurement of Changing Rate of Capacitance

The capacitance was determined similarly to the evaluation of capacitance using the aqueous electrolyte described above, except for setting the current of constant current discharge to 1000 $\mu A$. With this capacitance denoted as $C_{1000}$ and the capacitance determined from discharge of 100 $\mu A$ denoted as $C_{100}$, changing rate of capacitance ($\Delta C$) was calculated by the following equation.

$$\Delta C=(C_{1000}-C_{100})/C_{100} \times 100$$

The following Examples further illustrate the present invention in detail, but the present invention is not limited by these Examples.

EXAMPLES

Production of Electrode Material of the Present Invention

Example 1

To 100 parts by weight of a granular phenolic resin (Bellpearl R800, manufactured by Kanebo, Ltd.) having a mean particle size of 20 $\mu m$, an aqueous solution of cobalt chloride of which concentration was controlled to a predetermined content of Co was added, followed by sufficient mixing in a mixer and further drying in an atmosphere at 110° C. for 24 hours. The dried sample was heated to 1000° C. at a rate of 50° C./hour in a nitrogen gas atmosphere in an electric furnace. After holding this temperature for 5 hours, the sample was cooled down to make carbonized samples having Co content of 0.2 parts by weight (carbonized sample 1), 1 part by weight (carbonized sample 2), 5 parts by weight (carbonized sample 3), 10 parts by weight (carbonized sample 4) and 120 parts by weight (carbonized sample 5).

Using fine particles of carbon having a specific surface area of 1500 $m^2/g$ as the raw material, the same operation was carried out to make carbonized samples having Co content of 0.2 parts by weight (carbonized sample 6), 1 part by weight (carbonized sample 7), 5 parts by weight (carbonized sample 8), 120 parts by weight (carbonized sample 9), 0.2 parts by weight (activated sample 10), 1 part by weight (activated sample 11), 5 parts by weight (activated sample 12) and 120 parts by weight. (activated sample 13). Activation was carried out at 800° C. in an atmosphere of a mixed gas of nitrogen and steam (1:1) for one hour. Samples 1 to 24 were washed with dilute nitric acid, deionized water and distilled water in this order to remove residual Co, and then dried at 115° C. for three hours.

The pore size distribution and pore volume of the samples made as described above were measured by X-ray diffraction with Cu—K α line. The results are shown in Table 1. The volume of pores having a pore diameter within a range of X±α nm ($3.0 \leq X < 10$, $\alpha = 1.0$, range of pore size distribution) is denoted as V1 and the total volume of mesopores having a pore diameter within a range from 2.0 to 50 nm is denoted as $V_0$. A ratio of the volume of pores having a pore diameter within a range of X±α nm. ($3.0 \leq X < 10$, $\alpha = 1.0$, range of pore size distribution) ($V_1$) to the volume of pores having a pore diameter within a range from 2.0 to 50 nm ($V_0$) is denoted as $V_1/V_0$ (%).

As is apparent from Table 1, in the carbonized samples 2, 3, 4 made from granular phenolic resin by carbonization, carbonized samples 7 and 8 made from fine particles of carbon by carbonization and the activated samples 11 and 12 made by activation, the volume of pores having a pore diameter within a range of X±α nm ($3.0 \leq X < 10$, $\alpha = 1.0$, range of pore size distribution) accounts for 15% or more of the total volume of mesopores having a pore diameter within a range from 2.0 to 50 nm, and a maximum value of very sharp pore size distribution exists in the range described above.

TABLE 1

| Samples | | Raw materials (Parts by weight) | | Amount of Co added (Parts by weight) | Heat treatment condition (Temperature × time) | Pore diameter in maximum value of pore size distribution (nm) |
|---|---|---|---|---|---|---|
| Carbonized sample | 1 | Phenolic resin | 100 | 0.2 | carbonized at 1000° C. × 5 H | 0.7 |
| Carbonized sample | 2 | | 100 | 1 | carbonized at 1000° C. × 5 H | 3.9 |
| Carbonized sample | 3 | | 100 | 5 | carbonized at 1000° C. × 5 H | 4.0 |
| Carbonized sample | 4 | | 100 | 10 | carbonized at 1000° C. × 5 H | 4.2 |
| Carbonized sample | 5 | | 100 | 120 | carbonized at 1000° C. × 5 H | 34.8 |
| Carbonized sample | 6 | Fine carbon particles | 100 | 0.2 | carbonized at 1000° C. × 5 H | 0.8 |
| Carbonized sample | 7 | | 100 | 1 | carbonized at 1000° C. × 5 H | 4.0 |
| Carbonized sample | 8 | | 100 | 5 | carbonized at 1000° C. × 5 H | 4.0 |
| Carbonized sample | 9 | | 100 | 120 | carbonized at 1000° C. × 5 H | 40.0 |
| Activated sample | 10 | Fine carbon particles | 100 | 0.2 | activated at 800° C. × 1 H | 1.7 |
| Activated sample | 11 | | 100 | 1 | activated at 800° C. × 1 H | 4.0 |
| Activated sample | 12 | | 100 | 5 | activated at 800° C. × 1 H | 4.0 |
| Activated sample | 13 | | 100 | 120 | activated at 800° C. × 1 H | 23.4 |

| Samples | | Volume (V1) of pores having pore diameter of X ± 1.0 nm | Total volume (V0) of mesopores having pore diameter ranging from 2.0 to 50 nm | V1/V0 (%) | Specific surface area (m²/g) | Element identified with X-ray |
|---|---|---|---|---|---|---|
| Carbonized sample | 1 | 0.006 | 0.111 | 5.4 | 22 | Co |
| Carbonized sample | 2 | 0.048 | 0.117 | 41.0 | 625 | Co, C |
| Carbonized sample | 3 | 0.099 | 0.175 | 56.6 | 587 | Co, C |
| Carbonized sample | 4 | 0.037 | 0.106 | 34.9 | 364 | Co, C |
| Carbonized sample | 5 | 0.005 | 0.075 | 6.7 | 155 | Co |
| Carbonized sample | 6 | 0.013 | 0.095 | 13.7 | 1486 | Co |
| Carbonized sample | 7 | 0.046 | 0.103 | 44.7 | 1510 | Co, C |
| Carbonized sample | 8 | 0.098 | 0.334 | 29.3 | 1415 | Co, C |
| Carbonized sample | 9 | 0.006 | 0.109 | 5.5 | 746 | Co |
| Activated sample | 10 | 0.014 | 0.105 | 13.3 | 1759 | Co |
| Activated sample | 11 | 0.035 | 0.102 | 34.3 | 1709 | Co, C |
| Activated sample | 12 | 0.141 | 0.368 | 38.3 | 1567 | Co, C |
| Activated sample | 13 | 0.079 | 0.635 | 12.4 | 1055 | Co |

X: Pore diameter, $3 \leq X < 10$
V1: Volume of pores having pore diameter of X ± 1.0 nm
V0: Total volume of mesopores having pore diameter ranging from 2.0 to 50 nm
5H: Heating time of five hours
1H: Heating time of one hour A diffraction peak originated in a graphite crystal is also observed. Accordingly, these samples are electrode materials that have such pores that are possessed by an electrode material suitable for large capacitance and large current discharge, namely pores of diameters large enough to form electric double layer evenly over the inner surface of the pores, with much of the pores having sufficient diameters for allowing organic compound and inorganic compound or the aggregates of electrolyte ions formed through solvation of these substances to move easily in the pores, and diffraction peak originated in a graphite crystal in X-ray diffraction.

The carbonized sample 1, the carbonized sample 6 and the activated sample 10 with small Co content have a maximum value of pore size distribution within a range of a pore diameter less than 2.0 nm, although the volume of pores having a pore diameter within a range of X±α nm ($3.0 \leq X < 10$, $\alpha = 1.0$, range of pore size distribution) accounts for less than 15% of the total volume of mesopores having a pore diameter within a range from 2.0 to 50 nm, and do not have a maximum value of pore size distribution in the range described above. Moreover, a diffraction peak originated in a graphite crystal is not observed.

The carbonized sample 5, the carbonized sample 9 and the activated sample 13 with excessive Co content have maximum values of pore size distribution around 20 to 40 nm, although the volume of pores having a pore diameter within a range of X±α nm (3.0≦X<10, α=1.0, range of pore size distribution) accounts for less than 15% of the total volume of mesopores having a pore diameter within a range from 2.0 to 50 nm, and do not have a maximum value of pore size distribution in the range described above. Moreover, a diffraction peak originated in a graphite crystal is not observed.

Accordingly, these samples do not include pores having pore diameters large enough to form an electric double layer evenly over the inner surface of the pores, and do not include enough pores that have a sufficient pore diameter for allowing the organic compound and inorganic compound or the aggregates of electrolyte ions formed through salvation of these substances to move easily in the pores.

FIG. 1 shows pore size distributions of the carbonized samples 1, 2, 3 and 5 as examples. The pore diameter is plotted along the abscissa and the volume of the pores having a pore diameter is plotted along the ordinate. As is apparent from the drawing, the samples 2, 3 have a maximum value of specific pore size distribution within a pore diameter range of X±α nm (3.0≦X<10, α=1.0, range of pore size distribution).

Example 2

To 100 parts by weight of granular phenolic resin similar to that of Example 1, an aqueous solution of cobalt chloride of which concentration was controlled to contain 5 parts by weight of Co was added, followed by sufficient mixing in a mixer and further drying in an atmosphere at 110° C. for 24 hours. The dried material was heated to a predetermined temperature at a rate of 50° C./hour in a nitrogen gas atmosphere in an electric furnace. After activating at this temperature for one hour in an atmosphere of a mixed gas of nitrogen and steam (1:1), the material was cooled to make a sample activated at 400° C. (activated sample 14), a sample activated at 550° C. (activated sample 15) and a sample activated at 700° C. (activated sample 16). Also after heating to a predetermined temperature at a rate of 50° C./hour in a nitrogen gas atmosphere, and holding this temperature for five hours and cooling, a sample carbonized at 550° C. (carbonized sample 17) and a sample carbonized at 1500° C. (carbonized sample 18) were made. The samples were washed well with dilute nitric acid, deionized water and distilled water in this order to remove residual Co, and then dried at 115° C. for three hours.

Physical properties of the samples made as described above were measured similarly to Example 1. The results are shown in Table 2. As is apparent from Table 2, the activated sample 16 that was activated at 700° C. and the carbonized samples 3, 18 carbonized at 1000° C. and 1500° C., respectively, have maximum values of specific pore size distribution within a pore diameter range of X±α nm (3.0≦X<10, α=1.0, range of pore size distribution), and values of $V_1/V_0$ within a range from 20 to 56%. Also the diffraction peak originated in a graphite crystals is observed.

Accordingly, these samples are electrode materials that include such pores that are possessed by an electrode material having large capacitance and is suited for large current discharge, namely pores of diameters large enough to form electric double layers evenly over the inner surface of the pores, with many of the pores having diameters large enough to allow organic electrolyte ions and inorganic electrolyte ions or the aggregates of electrolyte ions formed through solvation of these substances to move easily in the pores, and has a diffraction peak originated in a graphite crystal in X-ray diffraction.

It is found that, in the activated samples 14, 15 that were activated at 400° C. and 550° C., respectively, and the carbonized sample 17 that was carbonized at 550° C., pores are not formed sufficiently due to the low heat treatment temperatures and mesopores have not been developed. Also diffraction peak originated in a graphite crystal is not observed.

Accordingly, these samples do not include pores having a pore diameter large enough to allow an electric double layer to be formed evenly over the inner surface of the pores, and do not include many pores that have sufficient diameters for allowing organic electrolyte ions and inorganic electrolyte ions or the aggregates of electrolyte ions formed through salvation of these substances to move easily in the pores.

TABLE 2

| Samples | Raw materials (Parts by weight) | Amount of Co added (Parts by weight) | Heat treatment condition (Temperature × time) | Pore diameter in maximum value of pore size distribution (nm) | Volume of pores having pore diameter of X ± 1.0 nm (V1) |
| --- | --- | --- | --- | --- | --- |
| Activated sample 14 | Phenolic resin 100 | 5 | activated at 400° C. × 1 H | 0.7 | 0.001 |
| Activated sample 15 | | 5 | activated at 550° C. × 1 H | 0.7 | 0.002 |
| Activated sample 16 | | 5 | activated at 700° C. × 1 H | 4.0 | 0.025 |
| Carbonized sample 17 | | 5 | carbonized at 550° C. × 5 H | 0.7 | 0.002 |
| Carbonized sample 3 | | 5 | carbonized at 1000° C. × 5 H | 4.0 | 0.099 |
| Carbonized sample 18 | | 5 | carbonized at 1500° C. × 5 H | 4.0 | 0.018 |

TABLE 2-continued

| Samples | Total volume of mesopores having pore diameter ranging from 2.0 to 50 nm (V0) | V1/V0 (%) | Specific surface area (m²/g) | Elemental analysis value (%) | | | Element identified with X-ray |
|---|---|---|---|---|---|---|---|
| | | | | C | H | N | |
| Activated sample 14 | 0.012 | 8.3 | 22 | 72.09 | 6.25 | 0.82 | Co |
| Activated sample 15 | 0.016 | 12.5 | 86 | 83.56 | 4.93 | 0.93 | Co |
| Activated sample 16 | 0.099 | 25.3 | 699 | 93.34 | 1.85 | 0.83 | Co, C |
| Carbonized sample 17 | 0.032 | 6.3 | 2 | 82.34 | 5.87 | 0.97 | Co |
| Carbonized sample 3 | 0.175 | 56.6 | 587 | 97.18 | 0.60 | 0.92 | Co, C |
| Carbonized sample 18 | 0.089 | 20.2 | 39 | 99.02 | 0.38 | 0.51 | Co, C |

X: Pore diameter, $3 \leq X < 10$
V1: Volume of pores having pore diameter of $X \pm 1.0$ nm
V0: Total volume of mesopores having pore diameter ranging from 2.0 to 50 nm
5H: Heating time of five hours
1H: Heating time of one hour

Example 3

To 100 parts by weight of granular phenolic resin similar to that of Example 1, an aqueous solution of ferric chloride of 110° C. which concentration was controlled to contain 5 parts by weight of a metal was added, followed by sufficient mixing in a mixer and further drying in an atmosphere at 110 for 24 hours. The dried material was heated to 900° C. at a rate of 50° C./hour in a nitrogen gas atmosphere in an electric furnace and, after holding this temperature for five hours, cooled thereby to make a carbonized sample 19.

The carbonized sample 19 made as described above was measured for the pore size distribution, the volume of pores, CHN elemental analysis and X-ray analysis with Cu—K α line. The results are shown in Table 3. The CHN elemental analysis was conducted using the samples that were washed with dilute nitric acid, while samples not washed were used in the measurement of pore diameter and the X-ray diffraction analysis.

TABLE 3

| Samples | Carbonized sample 19 |
|---|---|
| Raw materials (Parts by weight) | Phenolic resin 100 |
| Amount of metal added | |
| Metal species | Fe |
| (Parts by weight) | 5 |
| Heat treatment condition (° C.) | carbonized at 900° C. × 5 H |
| Pore diameter X in maximum value of pore size distribution (nm) | 3.0 |
| Volume (V1) of pores having pore diameter of $X \pm 1.0$ nm | 0.041 |
| Total volume (V0) of mesopores having pore diameter ranging from 2.0 to 50 nm | 0.132 |
| V1/V0 (%) | 31.3 |
| Specific surface area (m²/g) | 65 |
| Elemental analysis value (%) | |
| C | 96.23 |
| H | 1.08 |

TABLE 3-continued

| Samples | Carbonized sample 19 |
|---|---|
| N | 0.35 |
| Element identified with X-ray | Fe, C |

X: Pore diameter, $3 \leq X < 10$
V1: Volume of pores having pore diameter of $X \pm 1.0$ nm
V0: Total volume of mesopores having pore diameter ranging from 2.0 to 50 nm
5H: Heating time of five hours AS is apparent from Table 3, the carbonized sample 19 that was prepared by carbonizing the mixture of a granular phenolic resin with ferric chloride added thereto has a very sharp peak in the pore size distribution around a diameter of 3.0 nm. As is apparent from these results, this sample include pores having a pore diameter within a range of $X \pm \alpha$ nm ($3.0 \leq X < 10$, $\alpha = 1.0$, range of pore size distribution) of which volume accounts for 15% or more of the total volume of mesopores having a pore diameter within a range from 2.0 to 50 nm, and has maximum values of pore size distribution in the range described above. Also the diffraction peak originated in graphite crystals is observed.

Accordingly, this sample is an electrode material that include such pores that are possessed by an electrode material which has a large capacitance an.d is suited for large current discharge, namely pores of sufficient diameters for forming electric double layers evenly over the inner surface of the pores, with many of the pores having sufficient diameters for allowing organic electrolyte ions, inorganic electrolyte ions or the aggregates of electrolyte ions formed through salvation of these substances to move easily in the pores, and a diffraction peak originated in a graphite crystal in X-ray diffraction.

Comparative Example 1

A granular phenolic resin (Bellpearl R800, manufactured by Kanebo, Ltd.) having a mean particle size of 20 μm was heated to a predetermined temperature at a rate.of 30° C./hour in a nitrogen gas atmosphere in an electric furnace. After holding this temperature for 5 hours, the sample was cooled down thereby to make a sample carbonized at 700°

C. (comparative carbonized sample 20) and a sample carbonized at 1000° C. (comparative carbonized sample 21). Also activation was carried out in an atmosphere of a mixed gas of nitrogen and steam (1:1) at a predetermined temperature for one hour, thereby to make a sample activated at 800° C. (comparative activated sample 22) and a sample activated at 1000° C. (activated sample 23). Physical properties of the Accordingly, these samples do not have pores having a pore diameter large enough to form an electric double layer evenly over the inner surface of the pores, and do not include many pores that have sufficient diameters for allowing organic electrolyte ions, inorganic electrolyte ions or the electrolyte ions formed through solvation of these substances to move easily in the pores.

TABLE 4

| Samples | Comparative sample 20 | Comparative sample 21 | Comparative sample 22 | Comparative sample 23 |
|---|---|---|---|---|
| Raw materials | Phenolic resin | | | |
| (Parts by weight) | 100 | 100 | 100 | 100 |
| Amount of transition metal added | 0 | 0 | 0 | 0 |
| (Parts by weight) | | | | |
| Heat treatment condition | carbonized at 700° C. × 5 H | carbonized at 100° C. × 5 H | carbonized at 800° C. × 1 H | carbonized at 1000° C. × 1 H |
| Pore diameter X in maximum value of pore size distribution (nm) | 0.7 | 0.7 | 0.8 | 0.8 |
| Volume (V1) of pores having pore diameter of X ± 1.0 nm | 0.04 | 0.000 | 0.006 | 0.014 |
| Total volume (V0) of mesopores having pore diameter ranging from 2.0 to 50 nm | 0.028 | 0.010 | 0.043 | 0.098 |
| V1/V0 (%) | 14.3 | 0.0 | 14.0 | 14.3 |
| Specific surface area | 15 | 27 | 965 | 1825 |
| Elemental analysis value (%) | | | | |
| C | 94.57 | 98.76 | 95.91 | 98.25 |
| H | 1.84 | 0.59 | 1.39 | 0.72 |
| N | 0.73 | 0.83 | 0.68 | 0.74 |
| Element identified with X-ray | None | None | None | None |
| None | | | | |

V1: Volume of pores having pore diameter of X ± 1.0 nm
V0: Total volume of mesopores having pore diameter ranging from 2.0 to 50 nm
5H: Heating time of five hours
1H: Heating time of one hour comparative samples 20 to 23 were measured similarly to Example 1. The results are shown in Table 4.

As is apparent from Table 4, the comparative carbonized samples 20, 21 have pore volume as small as 0.028 cm$^3$/g and 0.010 cm$^3$/g, respectively, for pores having a pore diameter within a range from 2.0 to 50 nm, indicating that mesopores are hardly formed. Also the volume of pores having a pore diameter within a range of X±α nm (3.0≦X<10, α=1.0, range of pore size distribution) accounts for less than 15% of the total volume of mesopores having a pore diameter within a range from 2.0 to 50 nm, and a maximum value of the pore size distribution was not observed in the range described above. While the comparative activated samples 22, 23 have large values of specific surface area, well developed micropores and a maximum value of the pore size distribution around pore diameter of 0.8 nm, though the volume of pores having a pore diameter within a range of X±α nm (3.0≦X<10, α=1.0, range of pore size distribution) accounts for less than 15% of the total volume of mesopores having a pore diameter within a range from 2.0 to 50 nm, and a maximum value of the pore size distribution was not observed in the range described above. Thus it was found that an electrode material, where the volume of pores having a pore diameter within a range of X±α nm (3.0≦X<10, α=1.0, range of pore size distribution) accounts for 15% or more of the total volume of mesopores having a pore diameter within a range from 2.0 to 50 nm, could not be made from the comparative samples 20 to 23 without transition metal compound added thereto. Also diffraction peak originated in a graphite crystal was not observed.

Example 4

Coconut shell charcoal in the form of crushed pieces or cylinder that were commercially available, cokes and phenolic resin charcoal, each in the amount of 100 parts by weight, were immersed in an aqueous solution of copper chloride, and the amount of the additive was controlled so as to make the Cu content 2 parts by weight. The materials were dried in an atmosphere at 110° C. for 24 hours. The dried materials were heated to 900° C. at a rate of 30° C./hour in a nitrogen gas atmosphere in an electric furnace and, by holding this temperature for two hours, carbonized samples 24 and carbonized samples 25 originating from the coconut shell charcoal, cokes and phenolic resin charcoal as the starting materials were made. Part of the samples were washed with dilute nitric acid and washed carefully with water to remove residual Cu. Physical properties of the samples thus obtained were measured similarly to Example 1. Physical properties of the materials and the carbonized samples 24, 25 are shown in Table 5.

As is apparent from Table 5, electrode materials that include pores having a pore diameter within a range of X±α nm (3.0≦X<10, α=1.0, range of pore size distribution) of which volume accounts for 15% or more of the total volume of mesopores having a pore diameter within a range from 2.0 to 50 nm, could be made with the samples 24, 25 of different starting materials. Also diffraction peak originated in a graphite crystal was observed.

TABLE 5

| Samples | Carbonized sample 24 | Carbonized sample 24 |
|---|---|---|
| Raw materials | | |
| Raw material | Cokes | Phenolic resin charcoal |
| Shape | Crushed pieces | Cylinder |
| Particle size | (500–2000 μm) | (2 mmφ, 4–8 mmL) |
| Specific surface area | 23 | 12 |
| (Parts by weight) | 100 | 100 |
| Co added | 2 | 2 |
| (Parts by weight) | | |
| Heat treatment condition | 900° C. × 2 hours | 900° C × 2 hours |
| (Temperature × time) | | |
| Pore diameter X in maximum value of pore size distribution (nm) | 3.6 | 4.2 |
| Volume (V1) of pores having pore diameter of X ± 1.0 nm | 0.029 | 0.090 |
| Total volume (V0) of mesopores having pore diameter ranging from 2.0 to 50 nm | 0.104 | 0.132 |
| V1/V0 (%) | 27.9 | 68.2 |
| Specific surface area ($m^2/g$) | 27 | 15 |
| Elemental analysis value (%) | | |
| C | 95.36 | 96.72 |
| H | 1.27 | 0.97 |
| N | 1.32 | 0.83 |
| Element identified with X-ray | Cu, C | Cu, C |

X: Pore diameter, $3 \leq X < 10$
V1: Volume of pores having pore diameter of X ± 1.0 nm
V0: Total volume of mesopores having pore diameter ranging from 2.0 to 50 nm Accordingly, these samples are electrode materials that include such pores that are possessed by an electrode material that has a large capacitance and is suited for large current discharge, namely pores of diameters large enough to allow an electric double layer to be formed evenly over the inner surface of the pores, with many of the pores having sufficient diameters for allowing organic electrolyte ions, inorganic electrolyte ions or electrolyte ions formed through solvation of these substances to move easily in the pores, and has a diffraction peak originated in a graphite crystal in X-ray diffraction.

Example 5

1.0 mol/l of an aqueous solution of nickel chloride was passed through a column filled with chelating resin (CR-11, manufactured by Mitsubishi Chemicals) to exchange $Ni^{2+}$ ion, and then dried at 110° C. for 12 hours. The dried material was heated from the room temperature to a predetermined temperature at a rate of 5° C./min in nitrogen gas atmosphere. Then by holding this temperature for three hours a sample carbonized at 400° C. (carbonized sample 26), a sample carbonized at 550° C. (carbonized sample 27), a sample carbonized at 700° C. (carbonized sample 28), a sample carbonized at 800° C. (carbonized sample 29), and a sample carbonized at 900° C. (carbonized sample 30) were made. Also the material was heated from the room temperature at a rate of 5° C./min in an atmosphere of a mixed gas of carbon dioxide and nitrogen (1:1) and held at this temperature of one hour, thereby to make a sample activated at 700° C. (activated sample 31) and a sample activated at 800° C. (activated sample 32).

Conditions of producing the samples, elements identified by X-ray diffraction, specific surface area, pore size distribution, pore volume and other properties are shown in Table 6, and examples of the pore size distribution are shown in FIGS. 2 to 5. An example of X-ray diffraction pattern is shown in FIG. 6.

As is apparent from Table 6, in the carbonized samples 26, 27 that were carbonized at temperatures lower than 600° C., a maximum value of the pore size distribution was located on the microscopic pore side also in case the metal added was Ni, and that the volume of pores having a pore diameter within a range of X±α nm ($3.0 \leq X < 10$, α=1.0, range of pore size distribution) accounts for less than 15% of the total volume of mesopores having a pore diameter within a range from 2.0 to 50 nm, and a maximum value of the pore size distribution was not observed in the range described above. This is supposedly because the formation of mesopores did not proceed due to the low carbonizing temperatures. At carbonization temperature or activation temperature of 600° C. or higher as in the cases of carbonized samples 28, 29, 30 and the activated samples 31, 32, a maximum value of the specific pore size distribution occurs around pore diameter of 4 nm, and the pore volume shows a large value in a pore diameter range of X±α nm ($3.0 \leq X < 10$, α=1.0, range of pore size distribution), indicating that a specific pore size distribution is formed. Also the diffraction peak originated in a graphite crystal is observed.

Accordingly, these samples are electrode materials which include such pores that are possessed by an electrode material having a large capacitance and suited for large current discharge, namely which has pores of diameters large enough to allow an electric double layer to be formed evenly over the inner surface of the pores, with many of the pores having sufficient diameters for allowing organic electrolyte ions, inorganic electrolyte ions or the electrolyte ions formed through solvation of these substances to move easily in the pores, and a diffraction peak originated in a graphite crystal in X-ray diffraction.

TABLE 6

| Samples | Amount of metal added | | Heat treatment condition (Temperature × time) | Pore diameter X in maximum value of pore size distribution (nm) | Volume (V1) of pores having pore diameter of X ± 1.0 nm | Total volume (V0) of mesopores having pore diameter ranging from 2.0 to 50 nm | V1/V0 (%) | Specific surface ($m^2$/g) | Element identified with X-ray |
|---|---|---|---|---|---|---|---|---|---|
| | Metal species | (Parts by weight) | | | | | | | |
| Carbonized sample 26 | Ni | 28.0 | Carbonized at 400° C. × 3 H | 0.62 | 0.005 | 0.041 | 12.2 | 191 | Ni |
| Carbonized sample 27 | Ni | 26.8 | Carbonized at 550° C. × 3 H | 0.78 | 0.014 | 0.104 | 13.5 | 236 | Ni |
| Carbonized sample 28 | Ni | 28.4 | Carbonized at 700° C. × 3 H | 4.00 | 0.108 | 0.177 | 61.0 | 109 | Ni, C |
| Carbonized sample 29 | Ni | 28.4 | Carbonized at 800° C. × 3 H | 4.03 | 0.121 | 0.165 | 73.3 | 97 | Ni, C |
| Carbonized sample 30 | Ni | 30.2 | Carbonized at 900° C. × 3 H | 4.00 | 0.138 | 0.170 | 81.2 | 99 | Ni, C |
| Activated sample 31 | Ni | 37.0 | activated at 700° C. × 1 H | 3.96 | 0.167 | 0.222 | 75.2 | 100 | Ni, C |
| Activated sample 32 | Ni | 48.2 | activated at 800° C. × 1 H | 3.93 | 0.186 | 0.265 | 70.2 | 109 | Ni, C |

X: Pore diameter, 3 ≤ X < 10
V1: Volume of pores having pore diameter of X ± 1.0 nm
V0: Total volume of mesopores having pore diameter ranging from 2.0 to 50 nm
3H: Heating time of three hours
1H: Heating time of one hour In the analysis of the elements identified in the X-ray diffraction shown in FIG. 6, a peak of a graphite crystal near 2θ=26°, in addition to the peak of Ni, was observed in the carbonized samples 28, 30 which were carbonized at temperatures of 600° C. or higher. This indicates that these samples are partially graphitized electrode materials. In order to graphitize a carbonized material, generally a high temperature within a range from 1500° C. to 200° C. is required. According to the present invention, however, it was found that partial graphitization could be achieved by carbonizing at a relatively low temperature around 700° C.

Example 6

Simple electric double layer capacitors as shown in FIG. 8 were produced. FIG. 8 shows the structure of the electric double layer capacitor in a sectional view. The carbonized samples 8, 28 and the activated samples 12, 16 that were made in Examples 1 to 5 and the comparative samples 21, 22 made in the Comparative Examples, six kinds in all, were sufficiently washed with dilute nitric acid, deionized water and distilled water, and dried at 115° C. for three hours, thereby making electrode materials.

These electrode materials and an aqueous solution of sulfuric acid of 30% by weight used as the electrolytic solution were mixed and subjected to impregnation in vacuum, to turn into slurry.

A platinum disk of 1 mm in thickness and 18 mm in diameter was used as a current collector 2. A silicone rubber disk of 0.5 mm in thickness, 3 mm in inner diameter and 18 mm in outer diameter used as a spacer 4 was pressed into contact with the current collector 2. The hole of 0.5 mm in depth.and 3 mm in inner diameter formed by the platinum plate and the silicone rubber was filled with the electrode material 1 impregnated with sulfuric acid, that was used as a polarizing electrode. Two pieces of the polarizing electrode were prepared from each of the electrode materials 1, and were disposed to face each other with a separator 3 made of polypropylene in a disk shape of 25 μm in thickness and 18 mm in outer diameter being interposed therebetween. Then terminal plates 5 made of stainless steel were pressed into contact with the current collector 2 from both sides thereof, for connecting lead wires. A load of 10 kg was applied on the terminal plates 5 made of stainless steel for securing.

Six kinds of electric double layer capacitor employing aqueous electrolyte were prepared by using the six kinds of electrode materials of the present invention as described above, and the capacitance and changing rate of capacitance thereof were measured. The results are shown in Table 7.

The carbonized samples 8, 28 and the activated samples 12, 16 that were made in Examples 1 to 5 proved to be electrode materials which have many pores of such diameters that allow the sulfate ions which act as the electrolyte to enter the pores and form an electric double layer evenly over the inner surface of the pores, and pores of sufficient diameters for allowing sulfate ions to move easily in the pores, and therefore have large, values of capacitance.

Also the carbonized samples 8, 28 and the activated samples 12, 16 that were made in Examples 1 to 5 proved to be electrode materials that have small changing rate of capacitance and are suited to discharge with a large current. This may also be attributed, similarly to the large capacitance, to the fact that the electrode materials of the present invention have pores of diameters large enough to allow sulfate ions to move easily in the pores, and have the diffraction peak originated in a graphite crystal in X-ray diffraction.

The comparative samples 21, 22 made in the Comparative Examples, on the other hand, do not have many pores of such diameters that allow the sulfate ions which act as the electrolyte to enter the pores and form electric double layer evenly over the inner surface of the pores, and allow sulfate ions to move easily in the pores, and therefore do not have large values of capacitance.

TABLE 7

| Samples | Amount of metal added | | Heat treatment condition (Temperature × time) | Pore diameter X in maximum value of pore size distribution (nm) | (V1) | (V0) | V1/V0 (%) | Specific surface area (m²/g) | Capacitance (F/g) | Changing rate of capacitance (%) |
|---|---|---|---|---|---|---|---|---|---|---|
| | Metal species | (Parts by weight) | | | | | | | | |
| Carbonized sample 8 | Co | 5.0 | carbonized at 1000° C. × 5 H | 4.0 | 0.098 | 0.334 | 29.3 | 1415 | 71 | −19 |
| Activated sample 12 | Co | 5.0 | activated at 800° C. × 1 H | 4.0 | 0.141 | 0.368 | 38.3 | 1567 | 73 | −16 |
| Activated sample 16 | Co | 5.0 | activated at 700° C. × 1 H | 4.0 | 0.025 | 0.099 | 25.3 | 699 | 67 | −16 |
| Carbonized sample 28 | Ni | 28.4 | carbonized at 700° C. × 3 H | 4.0 | 0.108 | 0.177 | 61.0 | 109 | 62 | −23 |
| Comparative sample 21 | None | 0.0 | carbonized at 1000° C. × 5 H | 0.7 | 0 | 0.010 | 0 | 27 | 21 | −47 |
| Comparative sample 22 | None | 0.0 | activated at 800° C. × 1 H | 0.8 | 0.006 | 0.043 | 14.0 | 965 | 48 | −53 |

X: Pore diameter, 3 ≦ X < 10
V1: Volume of pores having pore diameter of X ± 1.0 nm
V0: Total volume of mesopores having pore diameter ranging from 2.0 to 50 nm
1H: Heating time of one hour
3H: Heating time of three hours
5H: Heating time of five hours The comparative samples 21, 22 made in the comparative example showed large changing rates of capacitance, and were found to be not such electrode materials suited for discharging large current. This may also be attributed, similarly to the inability to achieve large capacitance, to the fact that these electrode materials do not have pores of sufficient diameters for allowing sulfate ions to move easily in the pores.

Example 7

The carbonized samples 8, 28 and the activated samples 12, 16 that were made in Examples 1 to 5 and the comparative samples 22, 23 made in the Comparative Examples, six kinds in all, were washed sufficiently with dilute nitric acid, deionized water, distilled water and the like and then dried at 115° C. for three hours, similarly to the case of Example 6. Non-aqueous electric double layer capacitors were made by using these electrode materials. 80 parts of the electrode material, 10 parts of Denka Black (manufactured by DENKI KAGAKU KOGYO KABUSHIKIKAISHA) as a conductive material and 10 parts of fluorine resin (Teflon 6J, manufactured by DUPONT-MITSUI FLUOROCHEMICALS) as a binder were mixed, and pressed to make electrodes of disk shape having a diameter of 20 mm. These electrodes, PVDF sheet (manufactured by Nihon Milllipore Limited) as a separator, and a propylene carbonate solution (1 mol/1 L) of tetra-ethylene ammonium boron tetrafluoride as the electrolyte, were used to make non-aqueous electric double layer capacitors. The construction is shown in FIG. 9.

TABLE 8

| Samples | Amount of metal added | | Heat treatment condition (Temperature × time) | Pore diameter X in maximum value of pore size distribution (nm) | (V1) | (V0) | V1/V0 (%) | Specific surface area (m²/g) | Capacitance (F/g) |
|---|---|---|---|---|---|---|---|---|---|
| | Metal species | (Parts by weight) | | | | | | | |
| Carbonized sample 8 | Co | 5.0 | carbonized at 1000° C. × 5 H | 4.0 | 0.098 | 0.334 | 29.3 | 1415 | 36 |
| Activated sample 12 | Co | 5.0 | activated at 800° C. × 1 H | 4.0 | 0.141 | 0.368 | 38.3 | 1556 | 39 |
| Activated sample 16 | Co | 5.0 | activated at 700° C. × 1 H | 4.0 | 0.025 | 0.099 | 25.3 | 699 | 33 |
| Carbonized sample 28 | Ni | 28.4 | carbonized at 700° C. × 3 H | 4.0 | 0.108 | 0.177 | 61.0 | 109 | 32 |
| Comparative sample 22 | None | 0.0 | activated at 800° C. × 1 H | 0.8 | 0.006 | 0.043 | 14.0 | 965 | 22 |
| Comparative sample 23 | None | 0.0 | activated at 1000° C. × 1 H | 0.8 | 0.014 | 0.098 | 14.0 | 1825 | 26 |

X: Pore diameter, 3 ≦ X < 10
V1: Volume of pores having pore diameter of X ± 1.0 nm
V0: Total volume of mesopores having pore diameter ranging from 2.0 to 50 nm
1H: Heating time of one hour
3H: Heating time of three hours
5H: Heating time of five hours The carbonized samples 8, 28 and the activated samples 12, 16 that were made in Examples 1 to 5 proved to be electrode materials that include many pores of such diameters that allow the tetra-ethylene ammonium boron tetrafluoride ions which act as the electrolyte to enter the pores and form an electric double layer evenly over the inner surface of the pores, and pores of sufficient diameters for allowing the ions to move easily in the pores, and therefore have large values of capacitance.

The comparative samples 21, 22 made in the comparative example, on the other hand, do not have many pores of such diameters that allow the tetra-ethylene ammonium boron tetrafluoride ions to enter the pores and form an electric double layer evenly over the inner surface of the pores, and allowing the ions to move easily in the pores, and are therefore not capable of achieving a large capacitance.

Example 8

25 g of saw dust of cedar wood that has been sieved to have particle sizes not larger than 1.0 mm and 25 g of bamboo chips of 5×5×20 mm in size were impregnated with 1.0 mol/l of an aqueous solution of a metal salt at the room temperature for 24 hours and the saw dust and the bamboo chips were filtered out of the aqueous solution of the metal salt and dried at the room temperature for three days. These materials were carbonized at predetermined temperatures in nitrogen gas atmosphere for one hour, and then cooled. Thus saw dust sample carbonized at 400° C. (carbonized sample 33), saw dust sample carbonized at 550° C. (carbonized sample 34), saw dust sample carbonized at 800° C. (carbonized sample 35), bamboo sample carbonized at 550° C. (carbonized sample 36) and bamboo sample carbonized at 800° C. (carbonized sample 37) were made. Further, saw dust was impregnated with aqueous solutions of iron chloride, nickel nitrate and cobalt nitrate, instead of the aqueous solution of iron nitrate, at the room temperature for 24 hours. The saw dust was filtered out of the aqueous solutions of metal salt, dried at the room temperature for three days, and was carbonized at 800° C. in nitrogen gas atmosphere for one hour and then cooled. Thus carbonized iron chloride sample (carbonized sample 38), carbonized nickel nitrate sample (carbonized sample 39) and carbonized cobalt nitrate sample (carbonized sample 40) were made.

TABLE 9

| Samples | Raw materials | Transition metal species | Heat treatment condition (Temperature × time) | Total volume (V0) of mesopores having pore diameter from 2.0 to 50 nm | V1/V0 (%) | Specific surface area (m²/g) | Element identified with X-ray |
|---|---|---|---|---|---|---|---|
| Carbonized sample | 33 Saw dust | Fe | carbonized at 400° C. × 1 H | 0.017 | 14 | 9 | None |
| Carbonized sample | 34 | Fe | carbonized at 550° C. × 1 H | 0.047 | 13 | 410 | Fe |
| Carbonized sample | 35 | Fe | carbonized at 800° C. × 1 H | 0.210 | 21 | 160 | Fe, C |
| Carbonized sample | 36 Bamboo | Fe | carbonized at 550° C. × 1 H | 0.019 | 14 | 480 | None |
| Carbonized sample | 37 | Fe | carbonized at 800° C. × 1 H | 0.185 | 17 | 190 | Fe, C |
| Carbonized sample | 38 Saw dust | Fe | carbonized at 800° C. × 1 H | 0.135 | 21 | 390 | Fe, C |
| Carbonized sample | 39 | Ni | carbonized at 800° C. × 1 H | 0.074 | 26 | 300 | Ni, C |
| Carbonized sample | 40 | Co | carbonized at 800° C. × 1 H | 0.177 | 24 | 130 | Co, C |

V1: Volume of pores having pore diameter of X ± 1.0 nm
V0: Total volume of mesopores having pore diameter ranging from 2.0 to 50 nm
1 H: Heating time of one hour The samples made as described above were measured for pore size distribution, volume of pores and X-ray analysis with Cu—K α line. The results are shown in Table 9. It can be seen from Table 9, that the carbonized sample 35 made by carbonizing saw dust at 800° C., and the carbonized sample 37, the carbonized iron chloride sample (carbonized sample 38), the carbonized nickel nitrate sample (carbonized sample 39) and the carbonized cobalt nitrate sample (carbonized sample 40) which were made by carbonizing saw dust or bamboo at 800° C. have a pore diameter within a range from 2.0 to 50 nm, pore volume of 0.210 cm³/g, 0.185 cm³/g, 0.135 cm³/g, 0.074 cm³/g and 0.177 cm³/g, respectively, showing large volumes of mesopores. Also the volume of pores in this range accounted for 15% or more of the pores having a pore diameter within a range from 2.0 to 50 nm, and the diffraction peak originated in a graphite crystal was observed.

Accordingly, these samples are electrode materials that include such pores that are possessed by an electrode material which has a large capacitance and is suited for large current discharge, namely pores of diameters large enough for forming an electric double layer evenly over the inner surface of the pores, with many of the pores having sufficient diameters for allowing organic electrolyte ions, inorganic electrolyte ions or the electrolyte ions formed through salvation of these substances to move easily in the pores, and a diffraction peak originated in a graphite crystal in X-ray diffraction.

It is found that, in the carbonized samples 33, 34 and 36 that were carbonized at 400° C. or 550° C., pores are not formed sufficiently due to the low heat treatment temperature and mesopores have not developed. Also the diffraction peak originated in a graphite crystal was not observed.

Accordingly, these samples do not include pores of diameters large enough to allow formation of an electric double layer evenly over the inner surface of the pores, and do not include many pores that have a pore diameter large enough to allow organic electrolyte ions, inorganic electrolyte ions or the electrolyte ions formed through salvation of these substances to move easily in the pores.

Comparative Example 2

25 g of saw dust of cedar wood that has been sieved to have particle sizes not larger than 1.0 mm and 25 g of bamboo chips of 5×5×20 mm in size were carbonized at predetermined temperatures in nitrogen gas atmosphere for one hour and then cooled. Thus saw dust sample carbonized at 400° C. (comparative carbonized sample 24), saw dust sample carbonized at 550° C. (comparative carbonized sample 25), saw dust sample carbonized at 800° C. (comparative carbonized sample 26) and bamboo sample carbonized at 800° C. (comparative carbonized sample 27) were made. Physical properties of these comparative samples 24 to 27 were measured similarly to Example 8. The results are shown in Table 10.

As is apparent from Table 10, the comparative carbonized samples 24, 25, 26, 27 have the volume of pores having a pore diameter within a range from 2.0 to 50 nm, of small values 0.010 cm$^3$/g, 0.025 cm$^3$/g, 0.022 cm$^3$/g and 0.014 cm$^3$/g, respectively, showing that mesopores are hardly formed. Also the diffraction peak originated in a graphite crystal was not observed.

Accordingly, these samples do not include pores of diameters large enough to allow formation of an electric double layer evenly over the inner surface of the pores, and do not include many pores that have sufficient diameters for allowing organic electrolyte ions, inorganic electrolyte ions or the electrolyte ions formed through salvation of these substances to move easily in the pores.

41 was washed with 5M hydrochloric acid solution to have copper included in the carbonized material to elute, and then the material was boiled in deionized water to remove hydrochloric acid and copper ion from the carbonized material, thereby making carbonized sample 42.

In a similar process, copper ion was exchanged by using an aqueous solution of copper sulfate having a concentration of 0.5 mol/l. After washing with water and natural drying, the material was dried at 110° C. for 12 hours. The dried material was heated from the room temperature to 800° C. at a rate of 5° C./min in a.nitrogen gas atmosphere. Then after holding this temperature for three hours, activation was carried out in an atmosphere of a mixed gas of carbon dioxide and nitrogen (1:1) for half an hour. Then the material was cooled to make activated sample 43. Further, part of the activated sample 43 was washed with 5M hydrochloric acid solution to have copper included in the activated material to elute, and then the material was boiled in deionized water to remove hydrochloric acid and copper ion from the activated material, thereby making activated sample 44. Further, part of the activated sample 44 was washed with 5M hydrochloric acid solution again to have copper included in the activated material to elute, and then the material was boiled in deionized water to remove hydrochloric acid and copper ion from the activated material, thereby making activated sample 45 after washing more vigorously.

The carbonized sample 41, the carbonized sample 42, the activated sample 43, the activated sample 44 and the activated sample 45 were used as the electrode materials to obtain five kinds of aqueous electric double layer capacitor similarly to Example 6, and the capacitance thereof was

TABLE 10

| Samples | Comparative sample 24 | Comparative sample 25 | Comparative sample 26 | Comparative sample 27 |
|---|---|---|---|---|
| Raw materials | | Saw dust | | Bamboo |
| (Parts by weight) | 100 | 100 | 100 | 100 |
| Amount of transition metal added (Parts by weight) | 0 | 0 | 0 | 0 |
| Heat treatment condition | carbonized at 400° C. × 1 H | carbonized at 600° C. × 1 H | carbonized at 800 × 1 H | carbonized at 800° C. × 1 H |
| Total volume (V0) of mesopores having pore diameter ranging from 2.0 to 50 nm | 0.010 | 0.025 | 0.022 | 0.014 |
| Specific surface area | 9 | 470 | 470 | 10 |
| Element identified with X-ray | None | None | None | None |

1 H: Heating time of one hour

Example 9

An aqueous solution of copper nitrate having concentration of 0.5 mol/l was passed, in an amount three times that of the ion exchange, through a column filled with an ion exchange resin (Duolite C-467, manufactured by Mitsubishi Chemical Inc.) to exchange copper ion and, after washing with water and natural drying, dried at 110° C. for 12 hours. The dried material was heated from the room temperature to 800° C. at a rate of 5° C./min in a nitrogen gas atmosphere. Then by holding this temperature for three hours, carbonized sample 41 was made. Further, part of the carbonized sample measured. 20 cycles of charge and discharge operations were repeated to evaluate the cycle characteristic of each capacitor.

Production conditions, specific surface area, pore size distribution, pore volume and other properties of.the samples made as described above and the capacitance of the capacitor are shown in table 11. Values of capacitance measured 20 times are shown in Table 12.

TABLE 11

| Samples | Raw materials | | Transition metal species | Heat treatment condition (Temperature x time) | Pickling with hydrochloric acid |
|---|---|---|---|---|---|
| Carbonized sample | 41 | Ion exchange resin C467 | Cu | carbonized at 800° C. x 3 H | x |
| Carbonized sample | 42 | Ion exchange resin C467 | Cu | carbonized at 800° C. x 3 H | |
| Activated sample | 43 | Ion exchange resin C467 | Cu | carbonized at 800° C. x 3 H, 750° C. x 0.5 H activated | x |
| Activated sample | 44 | Ion exchange resin C467 | Cu | carbonized at 800° C. x 3 H, activated at 750° C. x 0.5 H | |
| Activated sample | 45 | Ion exchange resin C467 | Cu | carbonized at 800° C. x 3 H, activated at 750° C. x 0.5 H | ⊙ |

| Samples | | Copper content (%) | (V1) | (V0) | V1/V0 (%) | Specific surface area ($m^2/g$) | Capacitance (F/g) |
|---|---|---|---|---|---|---|---|
| Carbonized sample | 41 | 34 | 0.031 | 0.071 | 43.7 | 454 | 105 |
| Carbonized sample | 42 | 1.4 | 0.101 | 0.209 | 48.3 | 956 | 140 |
| Activated sample | 43 | 26 | 0.043 | 0.110 | 39.1 | 233 | 85 |
| Activated sample | 44 | 1.9 | 0.085 | 0.180 | 47.2 | 895 | 152 |
| Activated sample | 45 | 0.002 | 0.039 | 0.146 | 26.7 | 900 | 76 |

X: Pore diameter, $3 \leq X < 10$
V1: Volume of pores having pore diameter of $X \pm 1.0$ nm
V0: Total volume of mesopores having pore diameter ranging from 2.0 to 50 nm
Pickling with hydrochloric acid: ○ means pickling, x means no pickling and ⊙ means enhanced pickling.
1 H: Heating time of one hour
3 H: Heating time of three hours
Capacitance: Calculated from the first and all subsequent charge/discharge cycles.

Table 11 shows that the carbonized sample 41, the carbonized sample 42, the activated sample 43, the activated sample 44 and the activated sample 45 include pores having a pore diameter within a range of $X \pm \alpha$ nm ($3.0 \leq X < 10$, $\alpha = 1.0$, range of pore size distribution) of which volume accounts for 15% or more of the total volume of mesopores having a pore diameter within a range from 2.0 to 50 nm.

TABLE 12

| Samples Cycles | Carbonized sample 41 (F/g) | Carbonized sample 42 (F/g) | Activated sample 43 (F/g) | Activated sample 44 (F/g) | Activated sample 45 (F/g) |
|---|---|---|---|---|---|
| 1 | 105 | 140 | 85 | 152 | 76 |
| 2 | 109 | 143 | 84 | 152 | 76 |
| 3 | 110 | 142 | 83 | 152 | 75 |
| 4 | 107 | 141 | 83 | 153 | 76 |
| 5 | 106 | 141 | 84 | 155 | 76 |
| 6 | 104 | 142 | 82 | 155 | 76 |
| 7 | 105 | 141 | 81 | 157 | 76 |
| 8 | 109 | 141 | 80 | 158 | 75 |
| 9 | 110 | 140 | 80 | 158 | 75 |
| 10 | 111 | 140 | 80 | 158 | 75 |
| 11 | 107 | 142 | 78 | 158 | 75 |
| 12 | 106 | 141 | 79 | 157 | 76 |
| 13 | 106 | 142 | 78 | 158 | 76 |
| 14 | 107 | 141 | 79 | 157 | 76 |
| 15 | 108 | 141 | 80 | 158 | 75 |
| 16 | 107 | 140 | 80 | 156 | 78 |
| 17 | 107 | 140 | 81 | 158 | 78 |
| 18 | 108 | 142 | 80 | 157 | 76 |
| 19 | 106 | 141 | 80 | 157 | 76 |
| 20 | 105 | 142 | 81 | 157 | 76 |

As is apparent from Table 11, the carbonized sample 41, the carbonized sample 42, the activated sample 43 and the activated sample 44 include many pores having a large pore diameter enough to allow the sulfate ions which act as the electrolyte to enter the pores and form an electric double layer evenly over the inner surface of the pores, and allow the ions to move easily in the pores, and are electrode materials that have a very large capacitance because copper included therein also contributes to the energy storage. It is also found that a stable capacitance is maintained through repetitive charge and discharge cycles, because the copper atoms are firmly secured in the carbon skeleton.

Example 10

To 100 parts by weight of a granular phenolic resin (Bellpearl R800, manufactured by Kanebo, Ltd.) having a mean particle size of 20 μm, an aqueous solution of copper chloride of which concentration was controlled to contain 10 parts by weight of Cu was added, followed by sufficient mixing in a mixer and further drying in an atmosphere at 110° C. for 24 hours. The dried material was heated from the room temperature to 800° C. at a rate of 5° C./min in a nitrogen gas atmosphere. After holding this temperature for 3 hours, the material was cooled down to make carbonized sample 46. Further, part of the carbonized sample 46 was washed with a 5M hydrochloric acid solution to have copper included in the carbonized material to elute, and then the material was boiled in deionized water to remove hydrochloric acid and copper ion from the carbonized material, thereby making carbonized sample 47.

Further, to 100 parts by weight of a granular phenolic resin (Bellpearl R800, manufactured by Kanebo,. Ltd.) having a mean particle size of 20 μm, an aqueous solution of copper chloride of which concentration was controlled to contain 10 parts by weight of Cu was added, followed by sufficient mixing in a mixer and further drying in an atmosphere at 110° C. for 24 hours. The dried material was heated from the room temperature to 800° C. at a rate of 5° C./min in a nitrogen gas atmosphere. After holding this temperature for 3 hours, the material was activated in an atmosphere of carbon dioxide and nitrogen (1:1) mixture gas for half an hour, and cooled down to make activated sample 48. Further, part of the activated sample 48 was washed with a 5M hydrochloric acid solution to have copper included in the activated material to elute, and then the material was boiled in deionized water to remove hydrochloric acid and copper ion from the activated material, thereby making activated sample 49.

The carbonized sample 46, the carbonized sample 47, the activated sample 48 and the activated sample 49 were used as the electrode materials to obtain four kinds of aqueous electric double layer capacitor similarly to Example 9, and the capacitance thereof was measured 20 cycles of charge and discharge operations were repeated to evaluate the cycle characteristic of each capacitor.

Production conditions, specific surface area, pore size distribution, pore volume and other properties of the samples made as described above and the capacitance of the capacitor are shown in table 13. Values of capacitance measured 20 times are shown in Table 14. Table 13 shows that the carbonized sample 46, the carbonized sample 47, the activated sample 48 and the activated sample 49 have a pore diameter within a range of X±α nm (3.0≦X<10, α=1.0, range of pore size distribution) of which volume accounts for 15% or more of the total volume of mesopores having a pore diameter within a range from 2.0 to 50 nm.

Accordingly, it is found that the carbonized sample 46, the carbonized sample 47, the activated sample 48 and the activated sample 49 have many pores having a large pore diameter enough to allow the sulfate ions which act as the electrolyte to enter the pores and form an electric double layer evenly over the inner surface of the pores, and allow the ions to move easily in the pores, and are electrode materials that have very large capacitance because copper included therein also contributes to the energy storage. It is also found that stable capacitance is maintained through repetitive charge and discharge cycles, because the copper atoms are firmly secured in the carbon skeleton.

TABLE 14

| Samples Cycles | Carbonized sample 46 (F/g) | Carbonized sample 47 (F/g) | Activated sample 48 (F/g) | Activated sample 49 (F/g) |
|---|---|---|---|---|
| 1 | 86 | 99 | 87 | 101 |
| 2 | 84 | 98 | 86 | 102 |
| 3 | 82 | 99 | 85 | 100 |
| 4 | 80 | 100 | 85 | 100 |
| 5 | 79 | 99 | 86 | 99 |
| 6 | 79 | 98 | 85 | 99 |
| 7 | 80 | 99 | 87 | 101 |
| 8 | 80 | 98 | 88 | 101 |
| 9 | 79 | 98 | 89 | 100 |
| 10 | 78 | 97 | 90 | 98 |
| 11 | 78 | 98 | 89 | 99 |
| 12 | 79 | 99 | 88 | 99 |
| 13 | 79 | 98 | 87 | 99 |
| 14 | 79 | 99 | 86 | 98 |
| 15 | 78 | 8 | 85 | 99 |
| 16 | 8 | 99 | 85 | 100 |
| 17 | 77 | 98 | 85 | 101 |
| 18 | 79 | 98 | 84 | 101 |
| 19 | 79 | 98 | 84 | 100 |
| 20 | 78 | 98 | 84 | 99 |

What is claimed is:

1. An electrode material that includes pores having a pore diameter within a range of X±α nm (3.0≦X<10, α=1.0; range of pore size distribution) of which volume accounts for 15% or more of the total volume of mesopores having a pore diameter within a range from 2.0 to 50 nm.

2. An electrode material according to claim 1, that has a maximum value of pore size distribution within a pore diameter range of X±α nm (3.0≦X<10, α=1.0; range of pore size distribution).

3. An electrode material according to claim 1, that has a diffraction peak originated in a graphite crystal in X-ray diffraction.

TABLE 13

| Samples | Raw materials | Transition metal species | Heat treatment condition (Temperature × time) | Pickling with hydrochloric acid |
|---|---|---|---|---|
| Carbonized sample 46 | Phenolic resin | Cu | carbonized at 800° C. × 3 H | X |
| Carbonized sample 47 | Phenolic resin | Cu | carbonized at 800° C. × 3 H | ○ |
| Carbonized sample 48 | Phenolic resin | Cu | carbonized at 800° C. × 3 H, activated at 800° C. × 1 H | X |
| Carbonized sample 49 | Phenolic resin | Cu | carbonized at 800° C. × 3 H, activated at 800° C. × 1 H | ○ |
| Comparative sample 21 | Phenolic resin | — | carbonized at 1000° C. × 5 H | X |
| Comparative sample 22 | Phenolic resin | — | activated at 800° C. × 1 H | X |

| Samples | | Copper content (%) | (V1) | (V0) | V1/V0 (%) | Specific surface area (m²/g) | Capacitance (F/g) |
|---|---|---|---|---|---|---|---|
| Carbonized sample | 46 | 12.3 | 0.015 | 0.087 | 17 | 560 | 86 |
| Carbonized sample | 47 | 1.5 | 0.022 | 0.099 | 22 | 756 | 99 |
| Carbonized sample | 48 | 11.3 | 0.029 | 0.132 | 22 | 780 | 97 |
| Carbonized sample | 49 | 2.2 | 0.048 | 0.176 | 27 | 880 | 101 |
| Comparative sample | 21 | 0 | 0 | 0.010 | 0 | 27 | 21 |
| Comparative sample | 22 | 0 | 0.006 | 0.043 | 14 | 965 | 48 |

X: Pore diameter, 3 ≦ X < 10
V1: Volume of pores having pore diameter of X ± 1.0 nm
V0: Total volume of mesopores having pore diameter ranging from 2.0 to 50 nm
Pickling with hydrochloric acid: ○ means pickling and X means no pickling.
1 H: Heating time of one hour
3 H: Heating time of three hours
Capacitance: Calculated from the first and all subsequent charge/discharge cycles.

4. An electrode material according to claim 1, that contains 0.01 to 50% by weight of a transition metal or a transition metal compound.

5. An electrode material according to claim 4, wherein said transition metal or transition metal compound is copper or a copper compound.

6. A method of producing the electrode material of claim 1, which comprises adding at least one transition metal or at least one transition metal compound to a carbon material or a carbon material precursor, and carbonating in a non-oxidizing atmosphere or activating in a slightly oxidizing atmosphere at a temperature of 600° C. or higher.

7. A method of producing the electrode material according to claim 6, wherein said carbon material is coconut shell charcoal, cokes, wooden charcoal, carbonized resin, bamboo charcoal, or a mixture thereof, and said carbon material precursor is coconut shell, coal, lumber, resin, bamboo, or a mixture thereof.

8. A method of producing the electrode material according to claim 7, wherein said carbonized resin is a carbonized ion exchange resin, or said resin is an ion exchange resin.

9. A method of producing the electrode material according to claim 7, wherein said carbonized resin is a carbonized phenolic resin, or said resin is a phenolic resin.

10. A method of producing the electrode material according to claim 6, wherein at least one transition metal or at least one transition metal compound is added in the amount of 0.01 to 100 parts by weight, in terms of transition metal, based on 100 parts by weight of said carbon material or carbon material precursor.

11. A method of producing the electrode material according to claim 6, wherein said transition metal or transition metal compound is metal powder, nitrate, acetate, sulfate, carbonate, phosphate, bromide, chloride, phosphide, oxide, or hydroxide.

12. A method of producing the electrode material according to claim 6, wherein said transition metal is copper, iron, cobalt, or nickel.

13. A battery comprising the electrode material of claim 1.

14. An electric double layer capacitor comprising the electrode material of claim 1.

* * * * *